(12) United States Patent
Kim et al.

(10) Patent No.: US 9,992,677 B2
(45) Date of Patent: *Jun. 5, 2018

(54) APPARATUS AND METHOD FOR REGISTERING HOME DEVICE IN SERVER IN HOME NETWORK SYSTEM

(71) Applicant: Samsung Electronics Co., Ltd., Suwon-si, Gyeonggi-do (KR)

(72) Inventors: Jun-Hyung Kim, Yongin-si (KR); Se-Hoon Kim, Seoul (KR); Dong-Keon Kong, Suwon-si (KR); Jai-Ick Chun, Seoul (KR); Yu-Mi Sohn, Seongnam-si (KR); Kang-Jin Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 67 days.

This patent is subject to a terminal disclaimer.

(21) Appl. No.: 15/106,028

(22) PCT Filed: Dec. 19, 2014

(86) PCT No.: PCT/KR2014/012562
§ 371 (c)(1),
(2) Date: Jun. 17, 2016

(87) PCT Pub. No.: WO2015/093887
PCT Pub. Date: Jun. 25, 2015

(65) Prior Publication Data
US 2017/0006471 A1    Jan. 5, 2017

(30) Foreign Application Priority Data

Dec. 20, 2013 (KR) .......... 10-2013-0160650
Aug. 6, 2014 (KR) .......... 10-2014-0101259

(51) Int. Cl.
*H04W 12/06* (2009.01)
*H04L 29/06* (2006.01)
(Continued)

(52) U.S. Cl.
CPC ............ *H04W 12/06* (2013.01); *G06F 21/45* (2013.01); *H04L 12/28* (2013.01);
(Continued)

(58) Field of Classification Search
CPC ........ H04W 12/06; G06F 21/45; H04L 12/28; H04L 63/08; H04L 63/0876
See application file for complete search history.

(56) References Cited

U.S. PATENT DOCUMENTS

2003/0177271 A1    9/2003  Park
2005/0149758 A1*   7/2005  Park .................. H04L 9/3236
                                                726/4
(Continued)

FOREIGN PATENT DOCUMENTS

EP            3 051 745 A1   8/2016
KR      10-2008-0068587 A    7/2008
KR      10-2013-0069287 A    6/2013

*Primary Examiner* — Wasika Nipa
(74) *Attorney, Agent, or Firm* — Jefferson IP Law, LLP

(57) ABSTRACT

The present invention relates to a method for registering a home device of a home network system in a server, the method comprising: receiving an access token from an account server managing an account for a control device; receiving a peer identifier (peer ID) identifying the home device and a peer group identifier (peer group ID) identifying a group of home devices from the control device; and logging into a connectivity server managing the connection between the home device and the control device on the basis of the access token, the peer ID, and the peer group ID.

16 Claims, 15 Drawing Sheets

(51) Int. Cl.
*H04L 12/28* (2006.01)
*G06F 21/45* (2013.01)

(52) U.S. Cl.
CPC ...... *H04L 12/2807* (2013.01); *H04L 12/2809* (2013.01); *H04L 12/2834* (2013.01); *H04L 63/08* (2013.01); *H04L 63/083* (2013.01); *H04L 63/0876* (2013.01)

(56) References Cited

U.S. PATENT DOCUMENTS

| | | |
|---|---|---|
| 2005/0273399 A1 | 12/2005 | Soma et al. |
| 2008/0178212 A1 | 7/2008 | Kinoshita |
| 2010/0125652 A1* | 5/2010 | Rantapuska ........ H04L 12/2818 709/222 |
| 2013/0227660 A1 | 8/2013 | Murakami et al. |

* cited by examiner

APPARATUS AND METHOD FOR REGISTERING HOME DEVICE IN SERVER IN HOME NETWORK SYSTEM

TECHNICAL FIELD

The present invention relates to an apparatus and method for registering a home device in a server in a home network system.

BACKGROUND

The home network system means a system wiredly or wirelessly connecting together home devices installed in a home to enable control of the home devices. An advanced home network system consolidates home devices through a home gateway (HGW) and connects them to an external public data network, e.g., an Internet protocol (IP) network (i.e., the Internet) to thereby provide more diversified services in association with the Internet. Such home network system may offer services desired by users by controlling the home devices according to the users' request.

Further, a separate device, such as a home gateway, should be used to enable connection to the home devices in the home to use control services out of the home, and this causes a deterioration of usability due to differences in control methods and procedures between inside and outside the home despite use the same control service.

Accordingly, an effort is required to enable use of various control services according to the same method and procedure regardless of whether it is in or outside home.

Meanwhile, the above-described information is provided only as background information for a better understanding of the present invention. No determinations and claims are made as to whether what has been described in this section may be applicable as the prior art related to the present invention.

An embodiment of the present invention proposes a method and apparatus for registering a home device in a server in a home network system.

Further, an embodiment of the present invention proposes a method and apparatus for registering device information on a home device in a service server through a control device in a home network system.

Further, an embodiment of the present invention proposes a method and apparatus for directly registering device information on a home device in a service server in a home network system.

Further, an embodiment of the present invention proposes a method and apparatus for controlling a home device registered in a server in a home network system.

SUMMARY

As proposed according to an embodiment of the present invention, a method for registering a home device in a server in a home network system comprises receiving an access token from an account server managing an account for a control device, receiving a peer identifier (ID) for identifying the home device and a peer group ID for identifying a group of home devices from the control device, and logging into a connectivity server managing connection between the home device and the control device based on the access token, the peer ID, and the peer group ID. As proposed according to another embodiment of the present invention, a method for registering a home device in a server by a control device in a home network system comprises receiving a peer ID for identifying the home device from a service server managing device information on the home device and transmitting a peer group ID for identifying a group of home devices and the peer ID to the home device.

As proposed according to still another embodiment of the present invention, a method for registering a home device by a service server in a home network system comprises transmitting a peer ID to be used when the home device logs into a connectivity server managing connection between the home device and a control device to the control device by the service server managing device information on the home device, wherein the peer ID is an ID for identifying the home device.

As proposed according to yet still another embodiment of the present invention, a method for registering a home device by an account server in a home network system comprises transmitting an authentication code to a control device by the account server managing an account for the control device, receiving a user ID for the control device and an authentication code from the home device, and identifying whether the authentication code received from the home device is the same as the authentication code transmitted to the control device, and when the two authentication codes are the same, transmitting, to the home device, an access token to be used when the home device logs into a connectivity server managing connection between the home device and the control device.

As proposed according to yet still another embodiment of the present invention, a method for registering a home device by a connectivity server in a home network system comprises receiving, from the home device, a login request using a peer ID for identifying the home device, a peer group ID for identifying a group of home devices, and an access token used to authenticate an authority of use of the home device, by the connectivity server managing connection between the home device and a control device and transmitting, to the home device, a login response corresponding to the login request.

As proposed according to yet still another embodiment of the present invention, a home device registered in a server in a home network system comprises a receiving unit receiving an access token from an account server managing an account for a control device and receiving a peer identifier (ID) for identifying the home device and a peer group ID for identifying a group of home devices from the control device and a controller controlling the receiving unit to log in the connectivity server based on the access token, the peer ID, and the peer group ID.

As proposed according to yet still another embodiment of the present invention, a home device in a home network system comprises a receiving unit configured to receive an access token from an account server managing an account for a control device and receive a peer identifier (ID) for identifying the home device and a peer group ID for identifying a group of home devices from the control device, and a controller configured to log into a connectivity server managing connection between the home device and the control device based on the access token, the peer ID, and the peer group ID.

As proposed according to yet still another embodiment of the present invention, a control device for registering a home device in a server comprises a receiving unit receiving a peer ID from a service server managing device information on the home device, a transmitting unit transmitting a peer group ID for identifying a group of home devices and the peer ID to the home device, and a controller controlling the transmitting unit and the receiving unit.

As proposed according to yet still another embodiment of the present invention, a control device for registering a home device in a server comprises a receiving unit configured to receive a peer ID for identifying the home device from a service server managing device information on the home device, and a transmitting unit configured to transmit a peer group ID for identifying a group of home devices and the peer ID to the home device.

As proposed according to yet still another embodiment of the present invention, a service server registering a device in a home network system comprises a transmitting unit transmitting a peer ID to be used when the home device logs into a connectivity server managing connection between the home device and a control device to the control device and a controller controlling the transmitting unit, wherein the peer ID is an ID for identifying the home device.

As proposed according to yet still another embodiment of the present invention, an account server registering a home device in a home network system comprises a transmitting unit transmitting an authentication code to a control device, identifying whether an authentication code received from the home device is the same as the authentication code transmitted to the control device, and when the two authentication codes are the same, transmitting, to the home device, an access token to be used when the home device logs into a connectivity server managing connection between the home device and the control device, a receiving unit receiving a user ID for the control device and the authentication code from the home device, and a controller controlling the transmitting unit and the receiving unit.

As proposed according to yet still another embodiment of the present invention, a connectivity server registering a home device in a home network system comprises a receiving unit receiving, from the home device, a login request using a peer ID for identifying the home device, a peer group ID for identifying a group of home devices, and an access token used to authenticate an authority of use of the home device, a transmitting unit transmitting a login response corresponding to the login request to the home device, and a controller controlling the transmitting unit and the receiving unit.

Other aspects, advantages, and core features of the present invention will be apparent to one of ordinary skill in the art from the following detailed description of exemplary embodiments of the present invention, taken into conjunction with the drawings.

Prior to going into the detailed description of the disclosure, it might be effective to define particular words and phrases as used herein. As used herein, the words "include" and "comprise" and their derivatives may mean doing so without any limitations. As used herein, the term "or" may mean "and/or." As used herein, the phrase "associated with" and "associated therewith" and their derivatives may mean "include," "be included within," "interconnect with," "contain," "be contained within," "connect to or with," "couple to or with," "be communicable with," "cooperate with," "interleave," "juxtapose," "be proximate to, "be bound to or with, "have, or "have a property of" As used herein, the word "controller" may mean any device, system, or part thereof controlling at least one operation. The device may be implemented in hardware, firmware, software, or some combinations of at least two thereof. It should be noted that functions, whatever particular controller is associated therewith, may be concentrated or distributed or implemented locally or remotely. It should be appreciated by one of ordinary skill in the art that the definitions of particular terms or phrases as used herein may be adopted for existing or future in many cases or even though not in most cases.

BRIEF DESCRIPTION OF THE DRAWINGS

Particular preferred embodiments of the present invention and the foregoing and other aspects, features, and advantages will be apparent from the following detailed description taken in conjunction with the accompanying drawings, wherein.

It should be noted that the same or similar reference denotations may be used to refer to the same or similar elements, features, or structures throughout the drawings.

DETAILED DESCRIPTION

Figure 1:
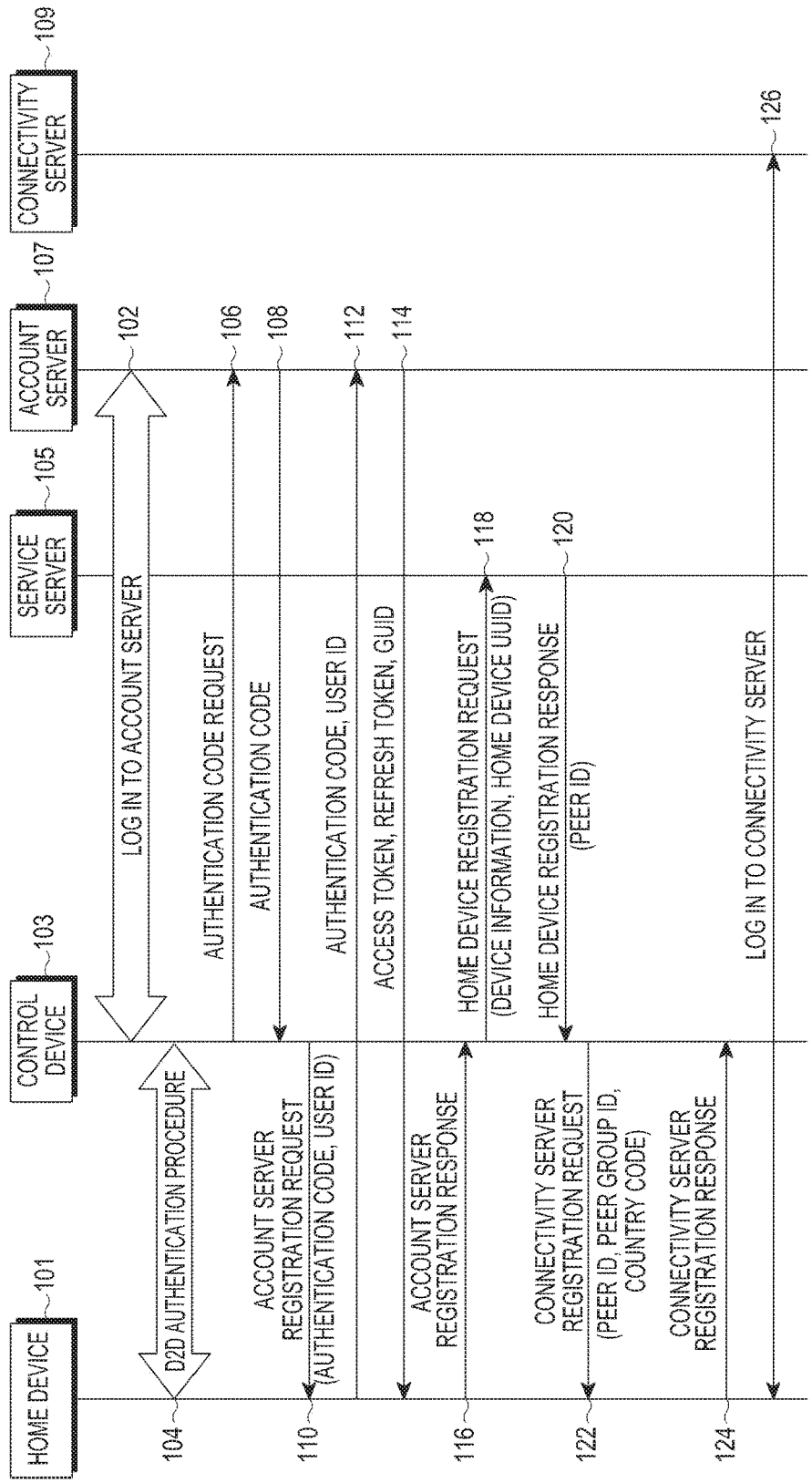
FIG. 1 is a view illustrating an example of a procedure for registering a home device in a server in a home network system according to an embodiment of the present invention.

Hereinafter, preferred embodiments of the present invention are described in detail with reference to the accompanying drawings. When determined to make the subject matter of the present invention unclear, the detailed description of the known art or functions may be skipped. The terms as used herein are defined considering the functions in the present invention and may be replaced with other terms according to the intention or practice of the user or operator. Therefore, the terms should be defined based on the overall disclosure.

Various changes may be made to the present invention, and the present invention may come with a diversity of embodiments. Some embodiments of the present invention are shown and described in connection with the drawings. However, it should be appreciated that the present invention is not limited to the embodiments, and all changes and/or equivalents or replacements thereto also belong to the scope of the present invention.

As used herein, the singular forms "a," "an," and "the" are intended to include the plural forms as well, unless the context clearly indicates otherwise. Accordingly, as an example, a "component surface" includes one or more component surfaces.

The terms coming with ordinal numbers such as 'first' and 'second' may be used to denote various components, but the components are not limited by the terms. The terms are used only to distinguish one component from another. For example, a first component may be denoted a second component, and vice versa without departing from the scope of the present invention. The term "and/or" may denote a combination(s) of a plurality of related items as listed or any of the items.

The terms as used herein are provided merely to describe some embodiments thereof, but not to limit the present invention. It is to be understood that the singular forms "a," "an," and "the" include plural references unless the context clearly dictates otherwise. It will be further understood that the terms "comprise" and/or "have," when used in this specification, specify the presence of stated features, integers, steps, operations, elements, and/or components, but do not preclude the presence or addition of one or more other features, integers, steps, operations, elements, components, and/or groups thereof.

Unless otherwise defined in connection with embodiments of the present invention, all terms including technical and scientific terms used herein have the same meaning as commonly understood by one of ordinary skill in the art to which the embodiments of the present invention belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

According to an embodiment of the present invention, an electronic device as disclosed herein may include a communication function. For example, the electronic device may be a smartphone, a tablet PC, a personal computer (PC), a mobile phone, a video phone, an e-book reader, a desktop PC, a laptop PC, a netbook PC, a personal digital assistant (PDA), a portable multimedia player (PMP), an MP3 player, a mobile medical device, a camera, a wearable device (e.g., a head-mounted device (HMD)), electronic clothes, an electronic bracelet, an electronic necklace, an electronic appcessory, an electronic tattoo, or a smart watch.

According to various embodiments of the disclosure, the electronic device may be a smart home appliance with a communication function. For example, the smart home appliance may be a television, a digital video disk (DVD) player, an audio player, a refrigerator, an air conditioner, a vacuum cleaner, an oven, a microwave oven, a washer, a drier, an air cleaner, a set-top box, a TV box (e.g., Samsung HomeSync™, Apple TV™, or Google TV™), a gaming console, an electronic dictionary, a camcorder, or an electronic picture frame.

According to various embodiments of the disclosure, the electronic device may be a medical device (e.g., magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, an sailing electronic device (e.g., a sailing navigation device, a gyroscope, or a compass), an aviation electronic device, a security device, or a robot for home or industry.

According to various embodiments of the disclosure, the electronic device may be a piece of furniture with a communication function, part of a building/structure, an electronic board, an electronic signature receiving device, a projector, or various measurement devices (e.g., devices for measuring water, electricity, gas, or electromagnetic waves).

According to various embodiments of the disclosure, an electronic device may be a combination of the above-listed devices. It should be appreciated by one of ordinary skill in the art that the electronic device is not limited to the above-described devices.

According to an embodiment of the present invention, the user terminal may be, e.g., an electronic device.

According to an embodiment of the present invention, described is a method for registering a home device in a server for providing services interworking between in and out of home in a home network system, e.g., a service server, an account server, and a connectivity server among the service server, the account server, the connectivity server, a push server, and a firmware management server. Further, according to an embodiment of the present invention, there is described a method in which a service server, an account server, and a connectivity server mutually interwork to communicate service signals with a home device in a home network system.

FIG. 1 is a view illustrating an example of a procedure for registering a home device in a server in a home network system according to an embodiment of the present invention.

Before describing FIG. 1, home devices installed in (or out of) a home are assumed to be already in connection with a home network system. That is, a newly purchased home device, when initially installed in (or out of) the home, performs a previous procedure for connection with a home network system, e.g., a control device, and at this time, the control device obtains and stores device information on the newly purchased home device and information such as a peer group identifier (ID) and a country code. The device information on the home device includes, e.g., a unique user identifier (UUID), which is a unique ID of the home device, and other information, such as regarding type, name, description, manufacturer, model ID, serial number, sales location, and version. Further, the peer group ID indicates a group of home devices that have been registered in a service server using a particular user account, and the country code indicates information on the country where the user of the control device is located.

Referring to FIG. 1, the network system as shown includes a home device 101, a control device 103, a service server 105, an account server 107, and a connectivity server 109.

The control device 103 is a device used for the purpose of the user to identify the state of the home device 101 or control the home device 101. The control device 103 may be, e.g., a mobile terminal, such as a smartphone, or a television (TV).

The home device 101 is a device that is located in the home (or out of the home) and that may be controlled through the control device 103. The home device 101 includes a home appliance (Smart Appliance), a security device, a lighting device, or an energy device. As an example, the home appliance may be a TV, an air conditioner, a refrigerator, a washer, a robot cleaner, or a humidifier, the security device may be a door lock, a security camera, a closed circuit television (CCTV), or a security sensor, the illumination device may be a light emitting diode (LED) or a lamp, and the energy device may be a heater, a power meter, a power socket, a receptacle, or a power strip. Additionally, the home device 101 may include a personal computer (PC), an IP camera, an Internet phone, a wired/wireless phone, or an electrically controllable curtain or blind.

The account server 107 is a server managing the account of the user of the control device 103. If the user logs into the account server 107, the account server 107 provides a function enabling connection with the service server 105 and the connectivity server 109 using single user login information.

The connectivity server 109 is a server providing a service enabling the configuration of a communication channel for message transmission between the home device 101 and the control device 103. The connectivity server 109 provides presence information indicating whether connection between the home device 101 and the control device 103 is possible and provides a network address translation-traversal (NAT-T) function enabling mutual remote connection through the firewall.

The account server 107 and the connectivity server 109 are public servers that may be utilized for other services as well as services provided from the home network system. By contrast, the service server 105 is operated only for home network system services. The service server 105 provides a function for storing and managing home device information for information circulation of the home device 101 and all other information for controlling the home device 101.

The user accesses the service server 105 using an application run on the control device 103, e.g., a smart home app. Further, the user may register the home device information in the service server 105, circulate or delete home device information already in registration, and the user may register control information for batch control or circulate or delete control information already in registration. Hereinafter, a procedure for the user to register the information on the home device 101 through the control device 103 is described in greater detail. Although a procedure for registering one home device 101 in a server is described as an example in connection with FIG. 1, the procedure described in connection with FIG. 1 may apply likewise to procedures for registering each of all home devices installable in (or out of) home in the server.

According to a user input, the control device 103 runs the smart home app, and the control device 103 simultaneously and automatically logs into the account server 107 (step 102). Here, an example is described in which the control device 103 automatically logs into the account server 107 through a user ID and password previously stored. Selectively, however, the control device 103 may receive the user ID and password from the user to log in the account server 107. Since the login information is maintained for a predetermined time unless logged out at the user's request, there is no need of repeatedly logging into the account server 107 within the valid period during which the login information is maintained. That is, the user may use his desired services even without performing an additional login procedure within the valid period.

The control device 103 discovers home devices located in home (or out of home), collects information on the home device, and displays the information on the screen. Among the home devices, a home device to be registered in the account server 107 is selected by a user input, and here, the home device selected according to the user input is assumed to be the home device 101 shown.

The control device 103 performs a device-to-device (D2D) authentication procedure with the home device 101 to mutually communication information (step 104). The discovery of home device, collection of information, and D2D authentication procedure should precede registration of the home device 101 in the account server 107 but is far away from what is intended to be described in connection with the instant embodiment and thus no detailed description thereof is given.

The control device 103 transmits an authentication code request to the account server 107 in order to register the home device 101 in the service server 105 (step 106), and the account server 107 issues an authentication code and transmits the code to the control device 103 in response to the request (step 108). The authentication code indicates a key value used for the home device 101 to receive an access token from the account server 107. The access token indicates a key value used for the connectivity server 109 to authenticate the authority of the home device 101 when the home device 101 accesses the connectivity server 109.

An example of implementing the operation of the control device 103 transmitting the authentication code request and receiving the authentication code in response to the request is shown in Tables 1 and 2. That is, Table 1 represents an example of the format of a message carrying the authentication code request, and Table 2 represents an example of the format of a message carrying the response to the request.

TABLE 1

```
Intent intent = new Intent( );
intent.setClassName("com.osp.app.signin","com.osp.app.signin.AccountVi
ew");
intent.putExtra("client_id", client_id);
intent.putExtra("client_ secret", client_ secret);
intent.putExtra("OSP_VER", "OSP_02"); // service app using OSP 2.0
startActivityForResult(intent, requestCode);
```

TABLE 2

```
@Override
    protected void onActivityResult(final int requestCode, final int
resultCode, Intent data) {
        If(resultCode == RESULT_OK){
            String authcode = data.getStringExtra("authcode");
        }
    }
}
```

Tables 1 and 2 represent embodiments of implementation inside the control device 103 and do not necessarily mean an actual procedure of exchanging messages with the account server 107. Further, an interworking client, e.g., an account server client, in the form of a library for communication with the account server 107 is equipped in the control device 103. The control device 103 may communicate service signals with the account server 107 using the interworking client. That is, the smart home app of the control device 103 calls in a function of the interworking client and exchanges messages with the account server 107 through the interworking client.

Further, the control device 103 transmits an account server registration request to the home device 101 (step 110). A message carrying the account server registration request includes the authentication code received from the account server 107 and the user ID used in step 102. At this time, the authentication code and the user ID are transferred to the home device 101 through a hypertext transfer protocol (HTTP)-based RESTful protocol.

An example of the format of message for the control device 103 to carry the account server registration request using the RESTful protocol is as shown in Table 3. Although Table 3 represents the message format using the user's email ID as an example of the user's ID, other user IDs may also be used, such as a nickname designated by the user, social security number, phone number, or other user's unique IDs. The RESTful protocol is a general protocol widely in use, and no detailed description thereof is given.

TABLE 3

| Request | Hand over the configuration value for SCS server access to the device |
|---|---|

```
PUT /devices/1/configuration/remote HTTP/1.1
Host: {IPv4Address}
X-API-Version: v1.5.0
Content-Type: application/json
Content-Length: {contentLength}

{
    " Remote": {
        "authCode": "2013-07-15T17:29:21",
        "emailID": " john@samsung.com",
    }
}
    Response
HTTP/1.1 204 No Content
```

The home device 101 transmits the authentication code and user ID received from the control device 103 to the account server 107 in order to receive an access token, refresh token, and globally unique identifier (GUID) (step 112). The account server 107 identifies the received authentication code and user ID and verifies whether the received authentication code is an authentication code that has been normally issued to the user indicated by the user ID. That is, the account server 107 examines whether the received authentication code is the same as the authentication code issued in step 108.

If the result of examination shows that the received authentication code is the same as the authentication code issued in step 108, the account server 107 determines that the received authentication code is an authentication code normally issued to the user and transmits an access token, refresh token, and GUID to the home device 101 (step 114). Here, the GUID means an identifier separately assigned for the account server 107 to identify the home device 101.

The access token has a valid period, and if the previously agreed-on valid period elapses, the access token is not valid any longer. Accordingly, in case the access token is desired to be used even after the valid period elapses, the access token should be renewed within the valid period. The refresh token is used to renew the access token. A procedure for renewing the access token is far away from what is intended to be described according to an embodiment of the present invention, and no further detailed description thereof is given.

Further, a procedure for receiving the access token from the account server 107 using a particular key value, such as the authentication code, is set forth in detail in request for comment (RFC) 6749 specified in the Internet engineering task force (IETF), and thus, no further detailed description thereof is given.

When the home device 101 receives the access token transmitted in step 114, the home device 101 transmits an account server registration response to the control device 103 in response to the account server registration request received in step 110 (step 116). Here, the account server registration response includes information indicating that registration of the home device 101 in the account server 107 has succeeded. An example of the format of a message carrying the account server registration response is as shown in Table 3.

Meanwhile, the home device 101 may fail to receive the access token in step 114. That is, the home device 101 may start to drive a preset timer while simultaneously transmitting the authentication code and user ID to the account server 107 and may not receive the access token from the account server 107 until the preset timer expires. In this case, the home device 101 transmits, to the control device 103, the account server registration response including information indicating that registration of the home device 101 in the account server 107 has failed (step 116). Here, the operation of the home device 101 determining whether to receive the access token using the timer has been described as an example. However, whether to receive the access token may be determined by any other examples.

The control device 103 transmits a home device registration request to the service server 105 in order to register device information on the home device 101 obtained through a previous procedure with the home device 101 in the service server 105 (step 118). A message carrying the home device registration request includes a UUID, which is a unique ID of the home device 101, and the device information on the home device 101. An example of the format of a message carrying the home device registration request is shown in Table 4.

TABLE 4

POST https://fwk.samsungsmarthome.com/shs/ devices↵
{↵
    "Device": {↵
        "uuid": "11111111-1111-0000-0000-000000000000",↵
        "type": "Oven",↵
        "name": "Oven",↵
        "description": "My Oven",↵
        "manufacturer": "Samsung Electronics",↵
        "modelID": "SSF-9100",↵
        "serialNumber": "SSF9100N830301HS",↵
        "salesLocation": "North_America",↵
        "versions": [↵
            {↵
                "id": "1",↵
                "number": "1.1.1.1",↵
                "type": "Firmware"↵
            },↵
            {↵
                "id": "2",↵
                "number": "2.2.2.2",↵
                "type": "Hardware"↵
            }↵
        ]↵
    }↵
}↵

The service server 105 transmits, to the control device 103, a home device registration response to the home device registration request (step 120). A message carrying the home device registration response includes a peer ID, and the peer ID means an identifier assigned by the service server 105 in order for the connectivity server 109 to identify the home device 101. The service server 105 assigns a peer ID with a unique value to each of all the home devices located in the home (or out of home).

The control device 103 transmits a connectivity server registration request to the home device 101 (step 122), and the home device 101 transmits, to the control device 103, a connectivity server registration response corresponding to the request (step 124). A message carrying the connectivity server registration request includes the peer ID received from the service server 105, a peer group ID and country code obtained through a previous procedure with the home device 101. Here, the peer group ID indicates a group including the home devices registered in the service server 105 using a particular user account. The control device 103 and the home device 101 registered using the particular user account have the same peer group ID. The country code indicates information on the country where the user of the control device 103 is located.

An example of the format of a message carrying the connectivity server registration request and the connectivity server registration response is as shown in Table 5.

TABLE 5

| Request↵ | Hand over the configuration value for SCS server access to the device↵ |

TABLE 5-continued

PUT /devices/1/configuration/remote HTTP/1.1↵
Host: {IPv4Address}↵
X-API-Version: v1.5.0↵
Content-Type: application/json↵
Content-Length: {contentLength}↵
↵
{↵
    " Remote": { ↵
        "peerID": "3600",↵
        "peerGroupID": "2013-08-01T00:00:00",↵
        "countryCode": "-3600"↵
    }↵
}↵
    Response↵     ↵
HTTP/1.1 204 No Content↵

Thereafter, the home device 101 logs into the connectivity server 109 using the peer ID, peer group ID, and country code received from the control device 103 and the access token received from the account server 107 (step 126).

The procedure of registering device information on the home device 101 in the service server 105 through the control device 103 has been described as an example in connection with FIG. 1. However, in case of previously obtaining information for registration in the service server 105 from the control device 103, the home device 101 may directly register its device information in the service server 105 without involving the control device 103. A procedure for directly registering the device information on the home device 101 in the service server 105 without involving the control device 103 is described below in further detail with reference to other embodiments of the present invention.

Figure 2:
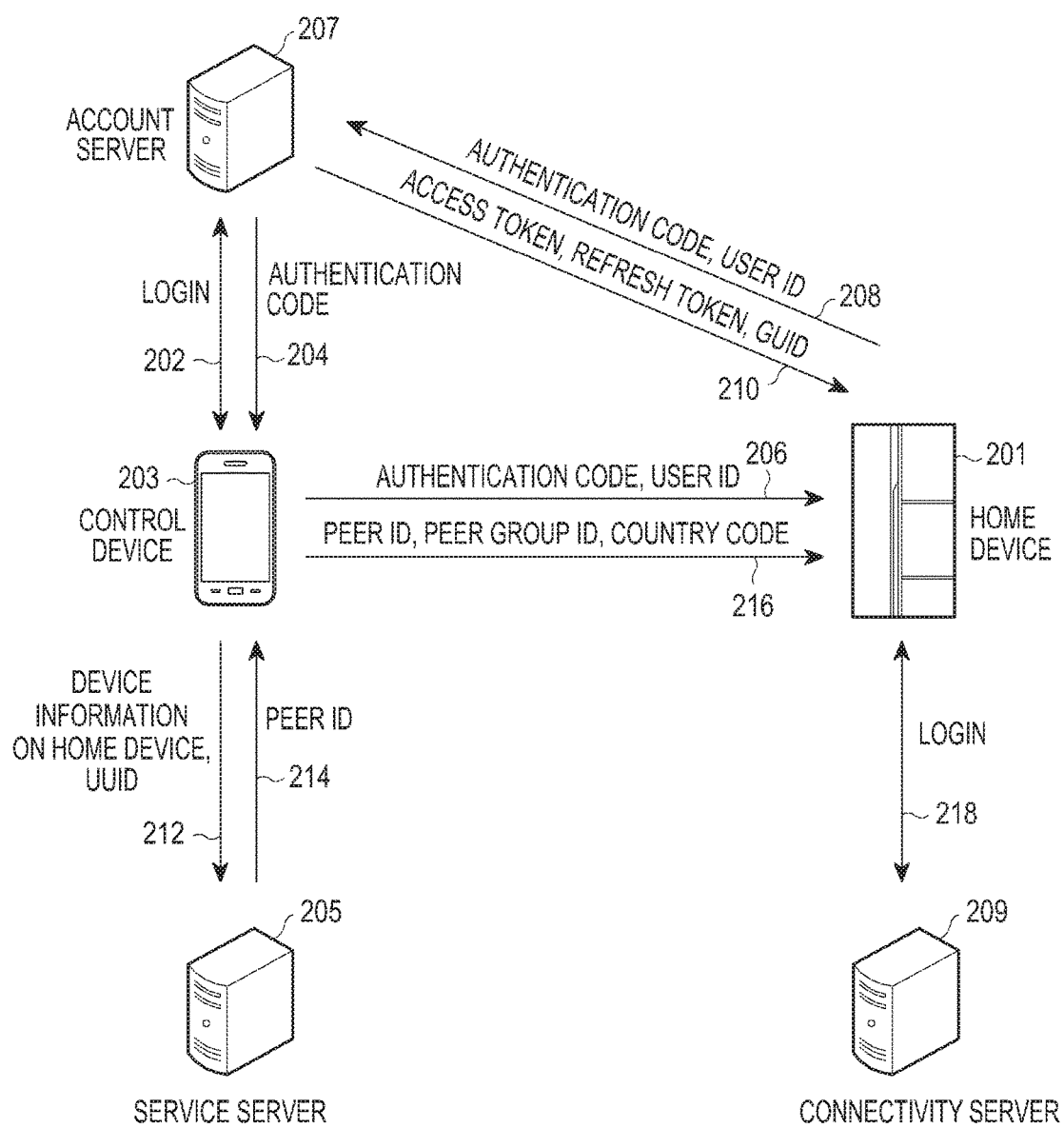
FIG. 2 is a view illustrating a flow of information exchanged for registering a home device in a server in a home network system according to an embodiment of the present invention.

FIG. 2 is a view illustrating a flow of information exchanged for registering a home device in a server in a home network system according to an embodiment of the present invention.

Referring to FIG. 2, the home network system as shown includes a home device 201, a control device 203, a service server 205, an account server 207, and a connectivity server 209.

The respective examples and functions of the home device 201, the control device 203, the service server 205, the account server 207, and the connectivity server 209 have been described above in detail with reference to FIG. 1, and no further detailed description thereof is given.

The control device 203 runs a smart home app according to a user input, and simultaneously logs into the account server 207 automatically (step 202). The account server 207 selected according to a user input among the home devices located in the home (or out of home), upon reception of an authentication code request from the control device 203, issues an authentication code and transmits the authentication code to the control device 203 in response to the request (step 204). Here, the home device 101 is assumed to be a home device selected according to a user input among the home devices located in the home (or out of home). The authentication code is used to register the home device 101 in the service server 105, and the authentication code particularly indicates a key value used for the home device 201 to receive an access token from the account server 207. The access token indicates a key value used for the connectivity server 209 to authenticate the authority to use the home device 201 when the home device 201 accesses the connectivity server 209.

The control device 203 transmits the user ID and authentication code received in step 204 to the home device 101 through an account server registration request (step 206).

Here, the user ID may be any one of, e.g., email ID, nickname, social security number, and phone number.

The home device 201 transmits the authentication code and user ID received in step 206 to the account server 207 in order to receive an access token, a refresh token, and a GUID (step 208).

The account server 207 identifies the authentication code and user ID received in step 208 and verifies whether the received authentication code is an authentication code normally issued to the user indicated by the user ID. That is, the account server 207 examines whether the received authentication code is the same as the authentication code issued in step 204.

If the result of examination shows that the received authentication code is the same as the authentication code issued in step 204, the account server 207 determines that the received authentication code is an authentication code normally issued to the user and transmits an access token, refresh token, and GUID to the home device 201 (step 210). Here, the GUID means an identifier separately assigned for the account server 207 to identify the home device 201.

Meanwhile, the control device 203 transmits device information on the home device 201 and the UUID, which is the unique ID of the home device 201, to the service server 205 through a home device registration request (step 212). Here, the device information on the home device 201 and the UUID are information obtained from the home device 201 through a previous procedure for connection with the control device 203 when the home device 201 is first installed in the home (or out of the home).

The service server 205 transmits a peer ID to the control device 203 through a home device registration response corresponding to the home device registration request (step 214). Here, the peer ID means an identifier assigned by the service server 205 in order for the connectivity server 209 to identify the home device 201. The service server 205 assigns a peer ID with a unique value to each of all the home devices located in the home (or out of home).

The control device 203 transmits the peer ID received in step 214, a peer group ID, and country code to the home device 201 through a connectivity server registration request (step 216). Here, the peer group ID and the country code are information obtained from the home device 201 through a previous procedure for connection with the control device 203 when the home device 201 is first installed in the home (or out of the home).

Thereafter, the home device 201 logs into the connectivity server 209 using the access token received in step 210 and the peer ID, peer group ID, and country code received in step 216 (step 218).

Figure 3:
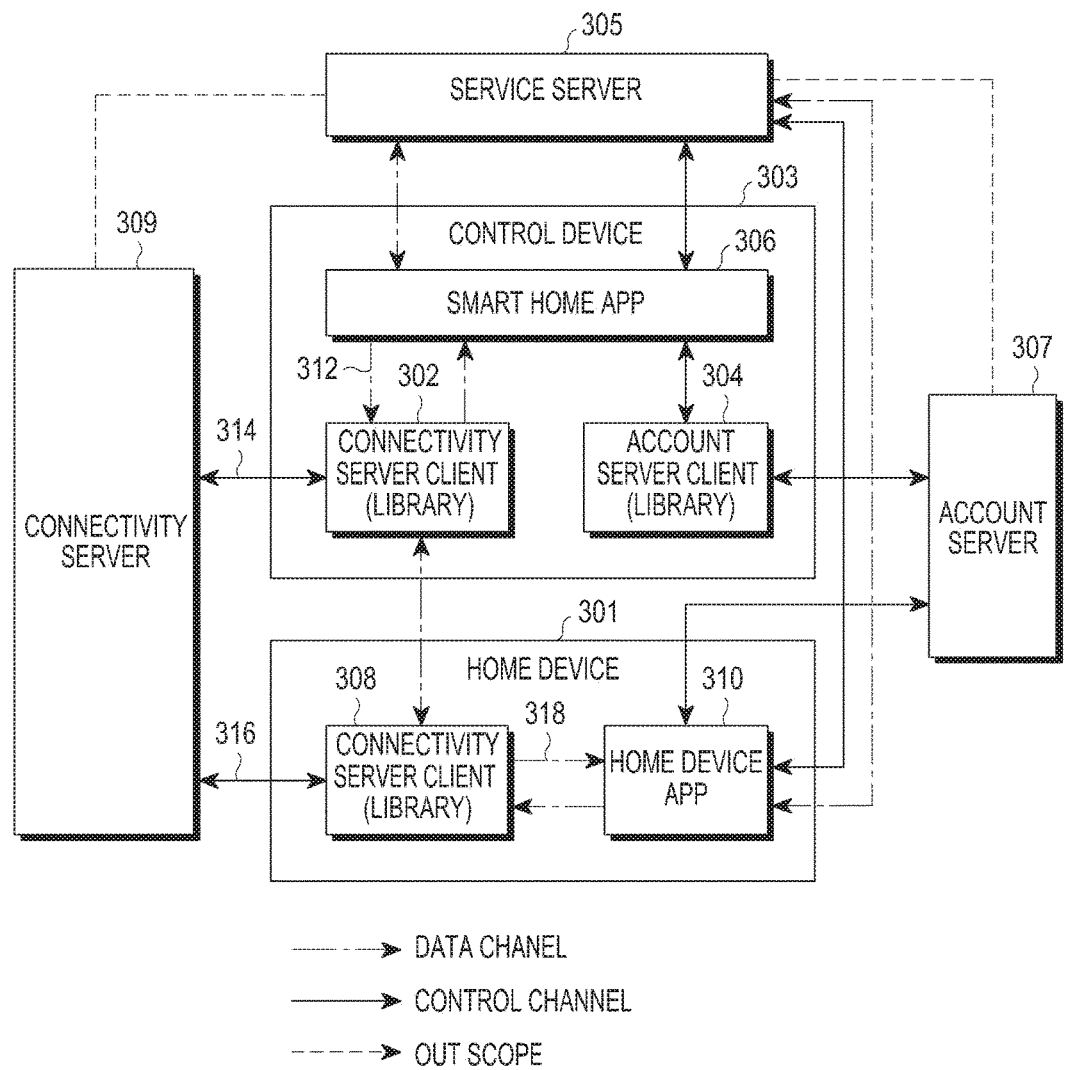
FIG. 3 is a view illustrating a software structure for communication between devices included in a home network system according to an embodiment of the present invention.

FIG. 3 is a view illustrating a software structure for communication between devices included in a home network system according to an embodiment of the present invention.

Referring to FIG. 3, the home network system as shown includes a plurality of devices, i.e., a home device 301, a control device 303, a service server 305, an account server 307, and a connectivity server 309.

The control device 303 includes a connectivity server client 302 in the form of a library for communication with the connectivity server 309, an account service client 304 in the form of a library for communication with the account server 307, and a smart home app 306.

The home device 301 includes a connectivity server client 308 in the form of a library for communication with the connectivity server 309 and an application running on the home device 301, e.g., a home device app 310, but the home device 301 does not include an account service client 304 for communication with the account server 307. The home device 301 communicates with the account server 307 through the home device app 310.

Further, the control device 303 communicates with the service server 305 through the smart home app 306, and the home device 301 communicates with the service server 305 through the home device app 310.

An operation of the control device 303 communicating messages with the home device 301 according to user inputs is described below.

The control device 303 runs the smart home app 306 according to a user input, and upon input of a control command for the home device from the user through the smart home app 306, the control device 303 transfers a message according to the control command to the connectivity server 309 through the connectivity server client 302 equipped in the control device 303 (steps 312 and 314).

The connectivity server client 308 equipped in the home device 301 receives the message transferred from the control device 303 through the connectivity server 309 (step 316), and the connectivity server client 308 transfers the received message to the home device app 310 (step 318).

That is, the connectivity server clients 302 and 308 respectively equipped in the control device 303 and the home device 301 communicate messages input from the user through the smart home app 306.

Meanwhile, in order for each connectivity server client 302 and 308 to communicate messages with the other, each needs to collect connection state information on the other. Described in connection with FIG. 4 is an operation in which the connectivity server client 308 in the home device 301 and the connectivity server client 302 in the control device 303 mutually collect connection state information, generate a channel for transferring messages, and communicate the messages.

Figure 4:
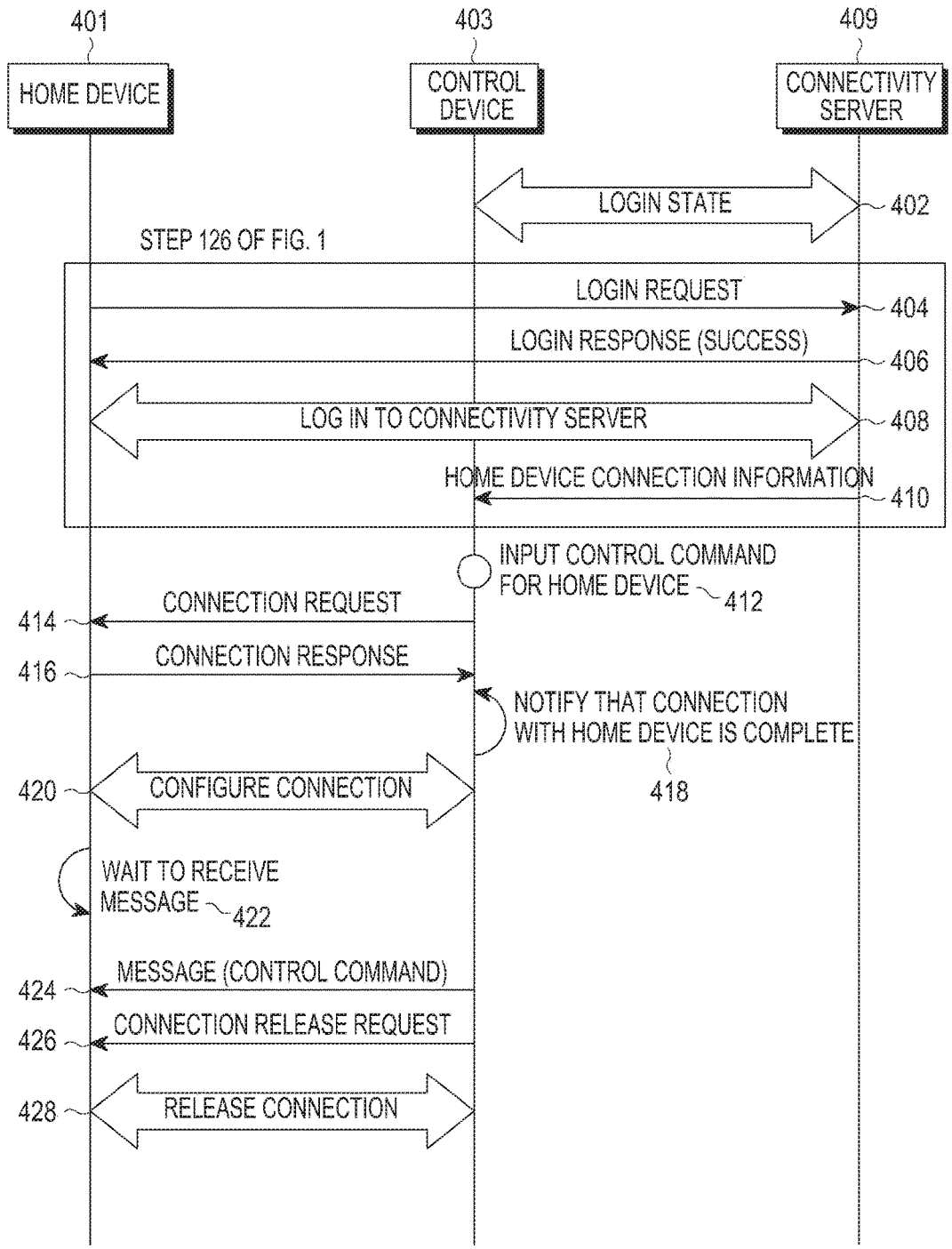
FIG. 4 is a view illustrating an example of a connection configuration and release procedure between a home device having logged into a connectivity server and a control device in a home network system according to an embodiment of the present invention.

FIG. 4 is a view illustrating an example of a connection configuration and release procedure between a home device having logged into a connection server and a control device in a home network system according to an embodiment of the present invention.

Referring to FIG. 4, the home network system shown includes a home device 401, a control device 403, and a connectivity server 409. Further, it is assumed in FIG. 4 that the control device 403 is in the state of logging into the connectivity server 409.

The home device 401 sends a login request to the connectivity server 409 using an access token received from an account server and a peer ID, peer group ID, and country code received from the control device (step 404) and attempts to log in the connectivity server 409. The connectivity server 409 transmits, to the home device 401, a login response indicating that the login has succeeded corresponding to the login request (step 406). Here, an example where the login attempted by the home device 401 succeeds has been described. However, in case the login attempted by the home device 401 fails, the connectivity server 409 transmits a login response indicating that the login has failed to the home device 401 corresponding to the login request.

If the home device 401 logs into the connectivity server 409 (step 408), the connectivity server 409 provides home device connection information including presence information to the control device 403 (step 410). The presence information indicates whether connection between the home device 401 and the control device 403 is made possible, and the presence information may be, e.g., information indicating that the home device 401 has logged into the connectivity server 409. In addition to the presence information, the home device connection information includes information on the IP address and port used by the home device 401 and information on the type of network used by the home device 401. Here, the network type information may be, e.g., Wi-Fi-related information, 2G-related information, 3G-related information, and 4G-related information.

Receiving the home device connection information, the control device 403 may be aware whether the home device is currently connectable. Further, although not shown, in case the home device 401 logs out of the connectivity server 409, the connectivity server 409 provides the control device 403 with home device connection information including information indicating that the home device 401 has logged out of the connectivity server 409, information on the IP address and port used by the home device 401, information on the type of network used by the home device 401.

Steps 404, 406, 408, and 410 described in connection with FIG. 4 are details of step 126 of FIG. 1, i.e., the procedure for the home device to log in the connectivity server.

Thereafter, upon input of a control command for the home device 401 from the user through the smart home app (step 412), the control device 403 transmits, to the home device 401, a connection request for configuring a channel between the home device 401 and the control device 403 (step 414). Here, the channel means a channel for the home device 401 and the control device 403 to communicate the message including the control command. Further, the connection request is transmitted to the home device 401 through the connectivity server client in the control device 403.

The home device 401 transmits a connection response corresponding to the connection request to the control device 403 (step 416). The control device 403 provides the user with information indicating that connection with the home device 401 has succeeded through the smart home app (step 418) and configures a connection with the home device 401 (step 420).

After completing to configure connection with the control device 403, the home device 401 waits to receive a message transmitted from the control device 403 (step 422), and the control device 403 transmits a message including a control command according to a user input to the home device 401 (step 424). Upon completion of the transmission of the message including the control command according to the user input, the control device 403 transmits, to the home device 401, a connection release request requesting to release the connection configured in step 420 (step 426). Then, the connection between the home device 401 and the control device 403 is released (step 428).

Messages communicated between the home device 401 and the control device 403 are communicated through a library-type connectivity server client for communication with the connectivity server 409. That is, the messages communicated in steps 414, 416, 424, and 426 are communicated through the connectivity server client in the home device 401 and the connectivity server client in the control device 403.

Figure 5:
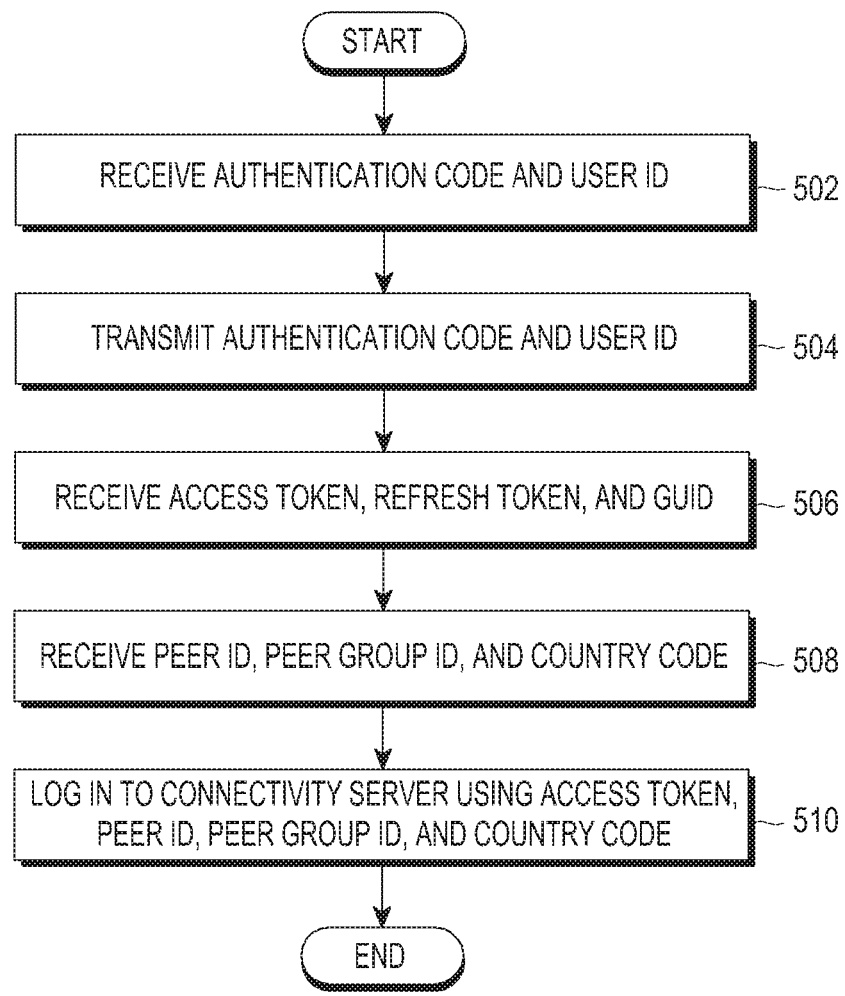
FIG. 5 is a flowchart illustrating an operation for registering a home device in a server in a home network system according to an embodiment of the present invention.

FIG. 5 is a flowchart illustrating an operation for registering a home device in a server in a home network system according to an embodiment of the present invention.

It is assumed in FIG. 5 that the home devices are located in the home (or out of the home), and in connection with FIG. 5, operations after the D2D authentication procedure has been complete between home device and control device are described. The D2D authentication procedure is far away from what is intended to be described according to an embodiment of the present invention, and no further detailed description thereof is given.

Further, although an operation for registering one of the home devices located in the home (or out of the home) in a server is described in connection with FIG. 5, as an example, the operation described in connection with FIG. 5 may apply likewise to operations for registering each of all of the home devices located in the home (or out of the home) in the server.

Referring to FIG. 5, the home device receives an authentication code used for receiving an access token and a user ID for the user of the control device from the control device in step 502. Here, the home device means a device located in the home (or out of the home) and controllable through the control device, and includes a home appliance, a security device, an illumination device, and an energy device. As an example, the home appliance may be a TV, an air conditioner, a refrigerator, a washer, a robot cleaner, or a humidifier, the security device may be a doorlock, a security camera, a CCTV, or a security sensor, the illumination device may be a LED or a lamp, and the energy device may be a heater, a power meter, a power socket, a receptacle, or a power strip. Additionally, the home device may include a PC, an IP camera, an Internet phone, a wired/wireless phone, or an electrically controllable curtain or blind. The access token denotes a key value used for a connectivity server to authenticate the authority to use the home device when the home device accesses the connectivity server managing the connection between home device and control device.

In step 504, the home device transmits the received authentication code and user ID to an account server managing the account of the user.

In step 506, the home device receives an access token, a refresh token, and a GUID from the account server. The refresh token means a token used to renew the access token within a previously agreed-on valid period so that the access token may be used after the valid period elapses. The GUID means an ID assigned and managed by the account server to identify the home device.

In step 508, the home device receives a peer ID, a peer group ID, and a country code from the control device. The peer ID means an ID managed by the connectivity server to identify the home device, the peer group ID an ID to identify a group of home devices registered in the service server managing information on the home device, and the country code a code indicating information on the country where the user is located.

In step 510, the home device logs into the connectivity server using the access token received in step 506 and the peer ID, peer group ID, and country code received in step 508.

Figure 6:
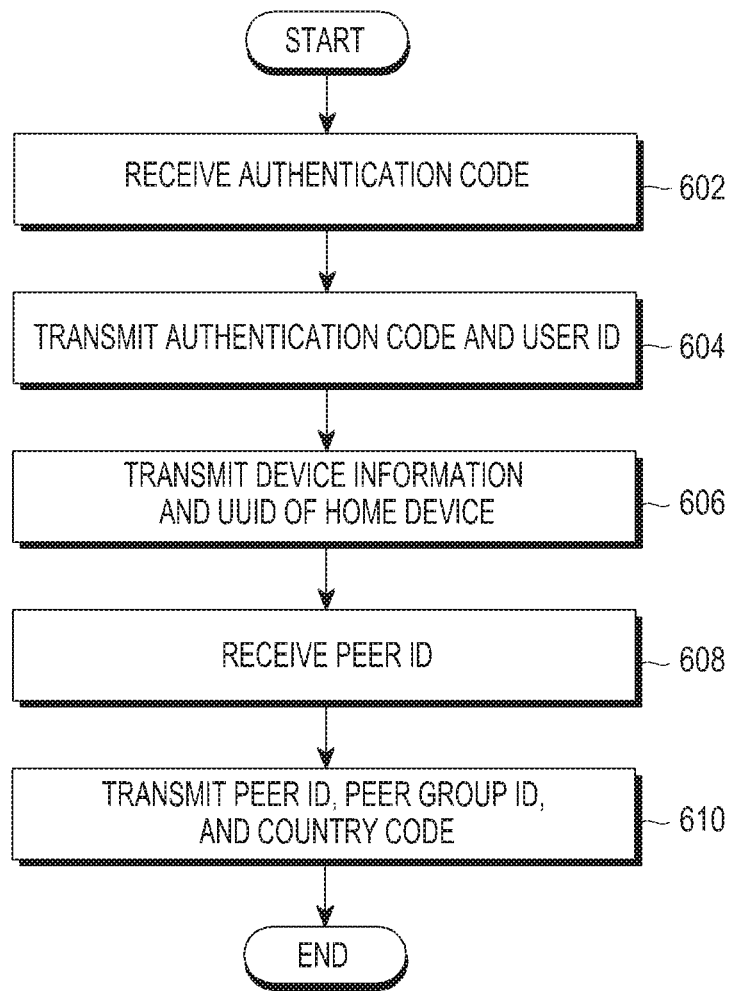
FIG. 6 is a flowchart illustrating an operation for a control device to register a home device in a server in a home network system according to an embodiment of the present invention.

FIG. 6 is a flowchart illustrating an operation for a control device to register a home device in a server in a home network system according to an embodiment of the present invention.

Referring to FIG. 6, the control device receives an authentication code used for the home device to receive an access token from an account server managing the user account of the control device in step 602. Here, the control device is a device used for the purpose of controlling the home device, and the control device may be, e.g., a mobile terminal or TV. The access token denotes a key value used for a connectivity server to authenticate the authority to use the home device when the home device accesses the connectivity server managing the connection between home device and control device.

In step 604, the control device transmits the received authentication code and user ID for the user of the control device to the home device.

In step 606, the control device transmits the UUID for the home device and the device information to a service server managing the device information on the home device. Here, the UUID and device information are information obtained and managed by the control device through a previous procedure for connection with the control device when the home device is first installed in the in the home (or out of the home). Further, an example of the device information includes the type, name, description, manufacturer, model ID, serial number, sales location, and version of the home device.

In step 608, the control device receives the peer ID managed by the connectivity server to identify the home device from the service server.

In step 610, the control device transmits the received peer ID and a peer group ID and country code to the home device. The peer ID, peer group ID, and country code are used for the home device to log in the connectivity server. The peer group ID and the country code are information obtained and managed by the control device through a previous procedure for connection with the control device when the home device is first installed in the in the home (or out of the home).

Figure 7:
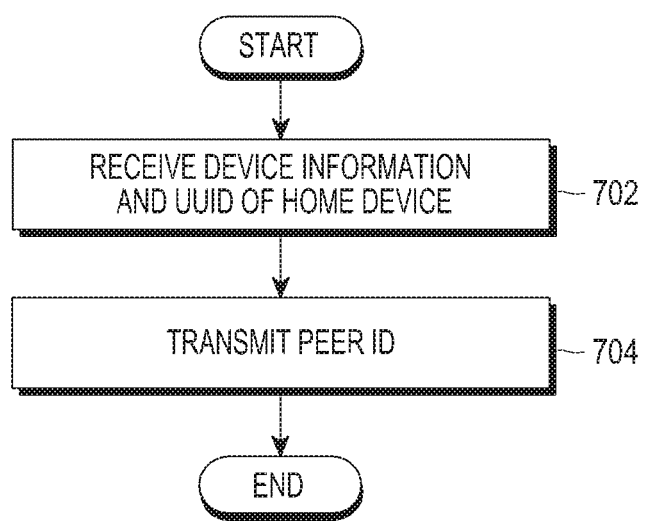
FIG. 7 is a flowchart illustrating an operation for a service server to register a home device in a home network system according to an embodiment of the present invention.

FIG. 7 is a flowchart illustrating an operation for a service server to register a home device in a home network system according to an embodiment of the present invention.

In FIG. 7, the service server is a server operated only for services provided from the home network system and provides the function of storing and managing all information for controlling the home device and the device information on the home device for information circulation of the home device.

Referring to FIG. 7, the service server receives and registers the UUID and device information on the home device in step 702. Here, an example of the device information includes the type, name, description, manufacturer, model ID, serial number, sales location, and version of the home device.

In step 704, the service server transmits, to the control device, the peer ID to be used for the home device to log in the connectivity server managing connection between home device and control device. Here, the peer ID means an ID managed by the connectivity server to identify the home device.

Figure 8:
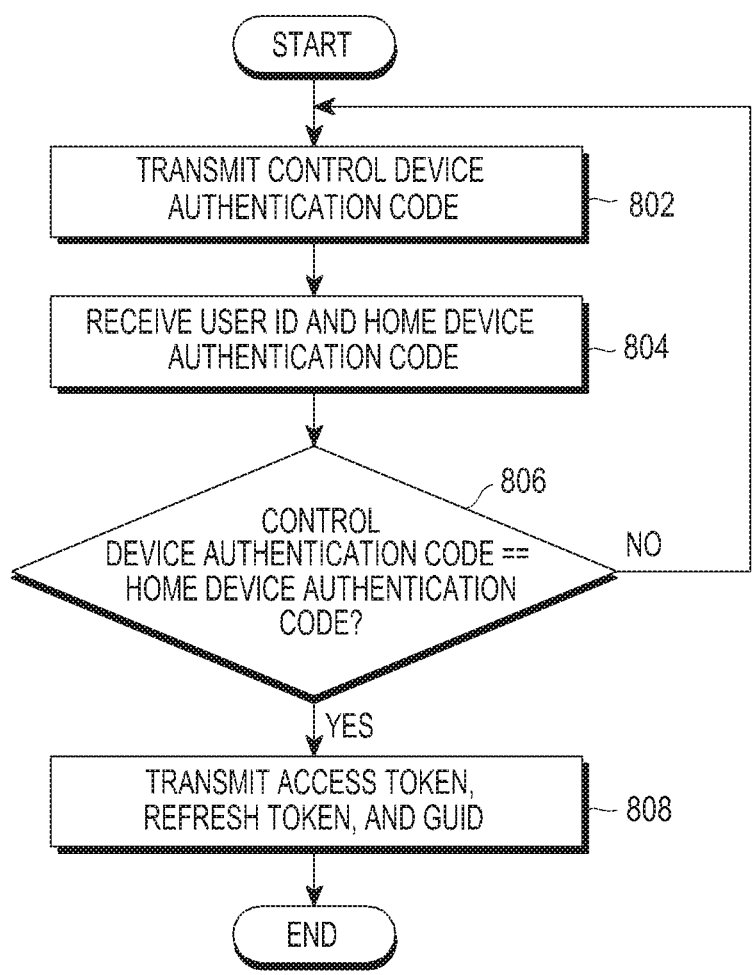
FIG. 8 is a flowchart illustrating an operation for an account server to register a home device in a home network system according to an embodiment of the present invention.

FIG. 8 is a flowchart illustrating an operation for an account server to register a home device in a home network system according to an embodiment of the present invention.

In FIG. 8, the account server is a server managing the account for the user of the control device and provides the function of allowing the user to connect to the service server and connectivity server using user login information when the user logs into the account server. Further, the account server is a public server that may be utilized for other services as well as services provided from the home network system.

Referring to FIG. 8, the account server transmits, to a control device, an authentication code used for the home device to receive an access token in step 802. Here, the access token denotes a key value used for a connectivity server to authenticate the authority to use the home device when the home device accesses the connectivity server managing the connection between home device and control device.

In step 804, the account server receives a user ID for the user of the control device and the authentication code from the home device.

In step 806, the account server identifies whether the control device authentication code transmitted in step 802 is the same as the home device authentication code received in step 804. If a result of the identification in step 806 shows that the control device authentication code is the same as the home device authentication code, the account server goes to step 808 to transmit an access token, a refresh token, and a GUID to the home device. Here, the access token is used for the home device to log in the connectivity server. Further, the refresh token is used to renew the access token within a previously agreed-on valid period so that the access token may be used after the valid period elapses. The GUID means an ID assigned and managed by the account server to identify the home device.

In case the result of identification in step 806 shows that the control device authentication code is not the same as the home device authentication code, the account server goes to step 802 to transmit, to the control device, the authentication code used for the home device to receive the access token.

Figure 9:
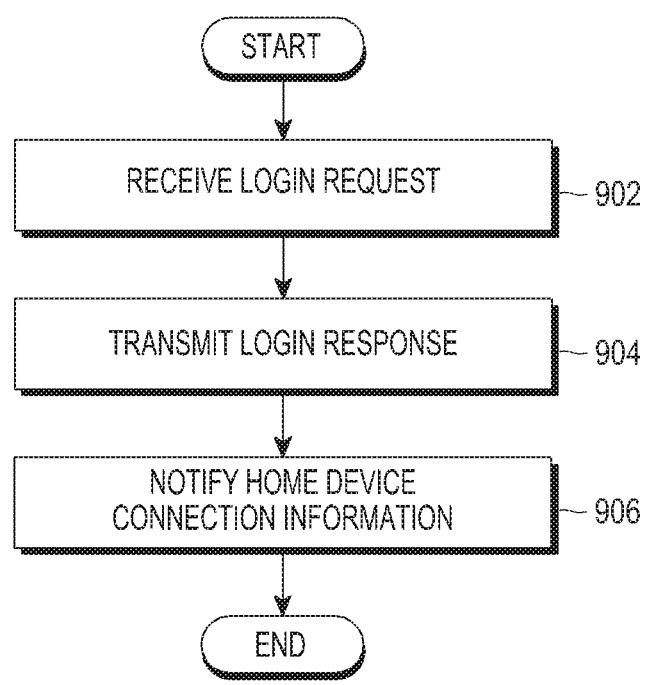
FIG. 9 is a flowchart illustrating an operation for a connectivity server to register a home device in a home network system according to an embodiment of the present invention.

FIG. 9 is a flowchart illustrating an operation for a connection server to register a home device in a home network system according to an embodiment of the present invention.

In FIG. 9, the connectivity server is a server providing a service allowing for configuration of a communication channel for message transmission between home device and control device. Further, the connectivity server provides presence information indicating whether connection between home device and control device is made possible and provides a NAT-T function allowing for mutual connection through a firewall from a remote site. Further, the connectivity server is a public server that may be utilized for other services as well as services provided from the home network system.

It is assumed in FIG. 9 that the connectivity server remains logging into the control device.

Referring to FIG. 9, the connectivity server receives, from the home device, a login request using a peer ID, peer group ID, country code, and access token in step 902. Here, the peer ID means an ID managed by the connectivity server to identify the home device, the peer group ID an ID to identify a group of home devices registered in the service server managing information on the home device, the country code a code indicating information on the country where the user is located, and the access token a token used to authenticate the authority of use of the home device.

In step 904, the connectivity server transmits, to the home device, a login response indicating that the login has succeeded corresponding to the login request in step 902.

In step 906, the connectivity server provides the control device with home device connection information including the presence information indicating whether connection between home device and control device is made possible. Here, an example of the presence information may be information indicating that the home device has logged into the connectivity server. In addition to the presence information, the home device connection information includes information on the IP address and port used by the home device and information on the type of network used by the home device. Here, the network type information may be, e.g., Wi-Fi-related information, 2G-related information, 3G-related information, and 4G-related information.

According to an embodiment of the present invention, an example for registering device information on the home device in the service server through the control device has been described. According to the following embodiment of the present invention, an example for directly registering device information on a home device in a service server without involving a control device is described.

Figure 10:
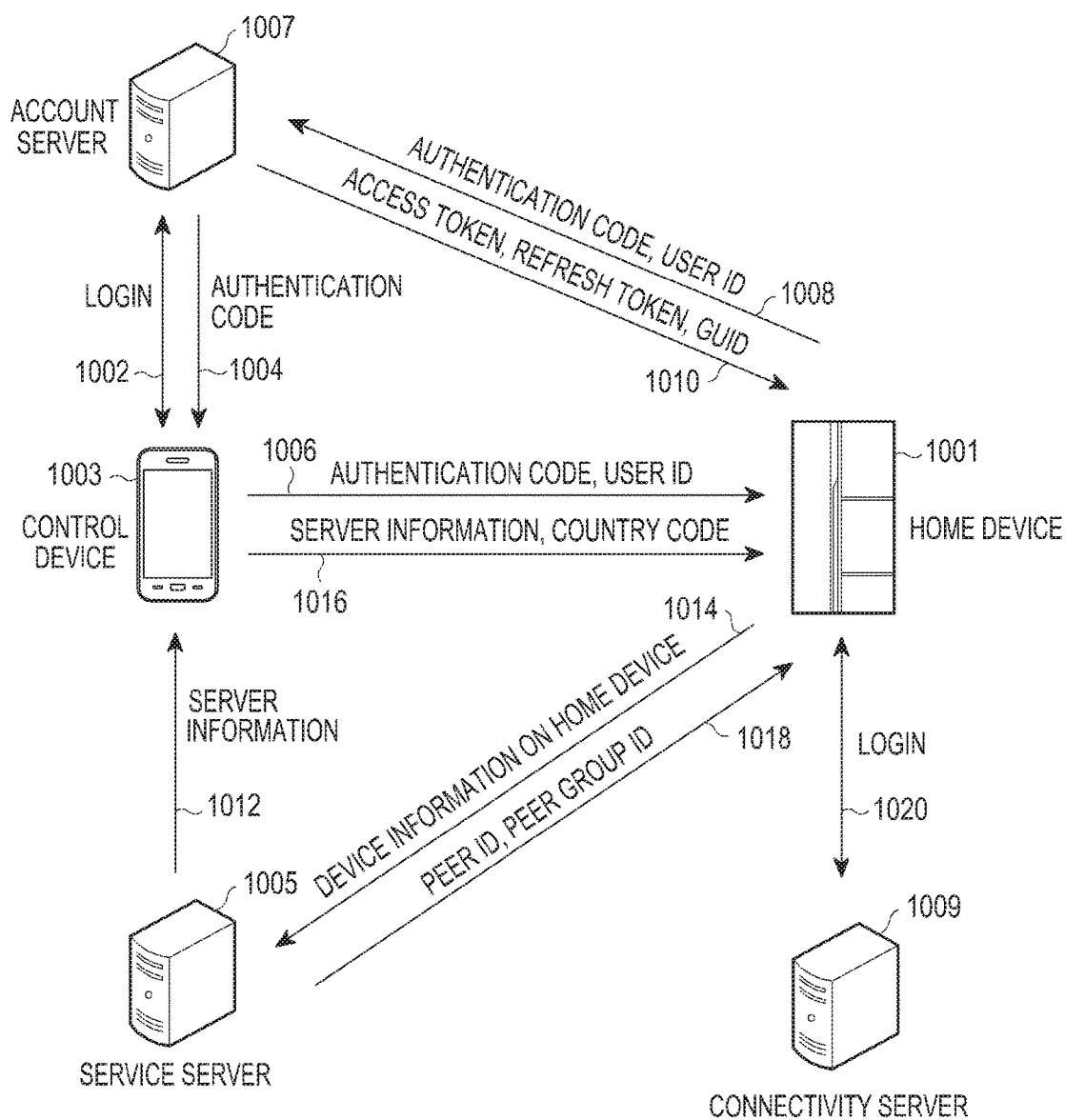
FIG. 10 is a view illustrating a flow of information exchanged for registering a home device in a server in a home network system according to another embodiment of the present invention.

FIG. 10 is a view illustrating a flow of information exchanged for registering a home device in a server in a home network system according to another embodiment of the present invention.

Referring to FIG. 10, the home network system as shown includes a home device 1001, a control device 1003, a service server 1005, an account server 1007, and a connectivity server 1009.

The respective examples and functions of the home device 1001, the control device 1003, the service server 1005, the account server 1007, and the connectivity server 1009 have been described above in detail with reference to FIG. 1, and no further detailed description thereof is given.

The control device 1003 runs a smart home app according to a user input and simultaneously logs into the account server 1007 automatically (step 1002).

If receiving an authentication code request from the control device 1003, the account server 1007 issues an authentication code in response to the request and transmits the authentication code to the control device 1003 (step 1004). The authentication code is used to register the home device 1001 in the service server 1005 and particularly indicates a key value for the home device 1001 to receive an access token from the account server 1007. The access token indicates a key value used for the connectivity server 1009 to authenticate the authority to use the home device 1001 when the home device 1001 accesses the connectivity server 1009.

The control device 1003 transmits the user ID and authentication code received in step 1004 to the home device 1001 through an account server registration request (step 1006). Here, the user ID may be any one of, e.g., email ID, nickname, social security number, and phone number.

The home device 1001 transmits the authentication code and user ID received in step 1006 to the account server 1007 in order to receive an access token and a refresh token (step 1008).

The account server 1007 identifies the authentication code and user ID received in step 1008 and verifies whether the received authentication code is an authentication code normally issued to the user indicated by the user ID. That is, the account server 1007 examines whether the received authentication code is the same as the authentication code issued in step 1004. If the result of examination shows that the received authentication code is the same as the authentication code issued in step 1004, the account server 1007 determines that the received authentication code is an authentication code normally issued to the user and transmits an access token, refresh token, and GUID to the home device 1001 (step 1010). Here, the GUID means an identifier separately assigned for the account server 1007 to identify the home device 1001.

Meanwhile, the control device 1003 receives server information including information relating to access to the service server 1005 from the service server 1005 (step 1012). An example of the server information may be address information for access to the service server 1005. Further, the control device 1003 transmits the server information and country code received from the service server 1005 to the home device 1001 (step 1016). Here, the peer group ID and the country code are information obtained from the home device 1001 through a previous procedure for connection with the control device 1003 when the home device 1001 is first installed in the home (or out of the home).

The home device 1001 accesses the service server 1005 using the information relating to accessing the service server 1005 included in the server information received in step 1016, transmits device information on the home device 1001 to the service server 1005, and registers the same (step 1014). Then, the home device 1001 receives a peer ID and peer group ID from the service server 1005 (step 1018). The device information on the home device 1001 and the peer group ID are information obtained from the home device 1001 through a previous procedure for connection with the control device 1003 when the home device 1001 is first installed in the home (or out of the home). The peer ID means an identifier assigned by the service server 1005 in order for the connectivity server 1009 to identify the home device 1001. Here, the service server 1005 assigns a peer ID with a unique value to each of all the home devices located in the home (or out of home).

Thereafter, the home device 1001 logs into the connectivity server 1009 using the access token received in step 1010, the country code received in step 1016, and the peer ID and peer group ID received in step 1018 (step 1020).

Figure 11:
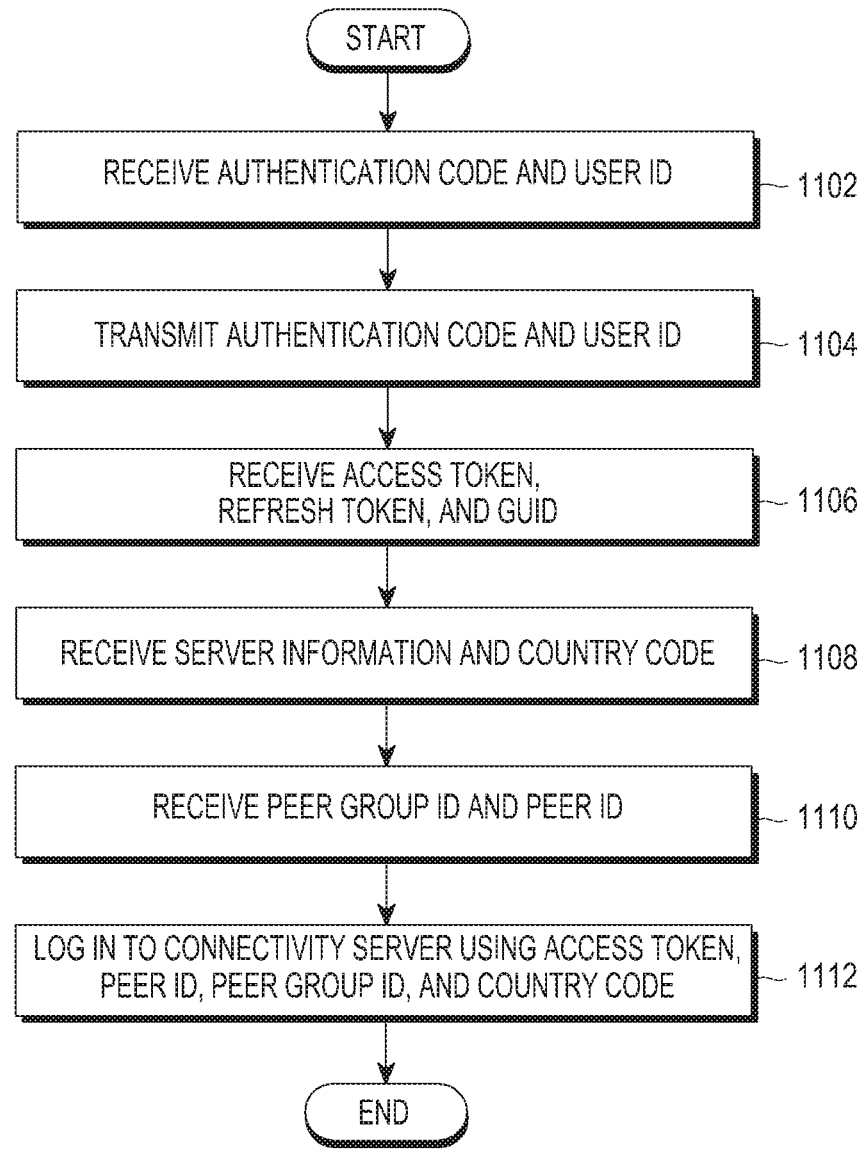
FIG. 11 is a flowchart illustrating an operation for registering a home device in a server in a home network system according to another embodiment of the present invention.

FIG. 11 is a flowchart illustrating an operation for registering a home device in a server in a home network system according to another embodiment of the present invention.

It is assumed in FIG. 11 that the home devices are located in the home (or out of the home), and in connection with FIG. 11, operations after the D2D authentication procedure has been complete between home device and control device are described. The D2D authentication procedure is far away from what is intended to be described according to another embodiment of the present invention, and no further detailed description thereof is given.

Further, although an operation for registering one of the home devices located in the home (or out of the home) in a server is described in connection with FIG. 11, as an example, the operation described in connection with FIG. 11 may apply likewise to operations for registering each of all of the home devices located in the home (or out of the home) in the server.

Referring to FIG. 11, the home device receives an authentication code used for receiving an access token and a user ID for the user of the control device from the control device in step 1102. Here, the home device means a device located in the home (or out of the home) and controllable through the control device, and may include a home appliance, a security device, an illumination device, an energy device, a PC, an IP camera, an Internet phone, a wired/wireless phone, or electrically connectable curtain or blind. The access token denotes a key value used for a connectivity server to authenticate the authority to use the home device when the home device accesses the connectivity server managing the connection between home device and control device.

In step 1104, the home device transmits the received authentication code and user ID to an account server managing the account of the user.

In step 1106, the home device receives an access token, a refresh token, and a GUID from the account server. The refresh token means a token used to renew the access token within a previously agreed-on valid period so that the access token may be used after the valid period elapses. The GUID means an ID assigned and managed by the account server to identify the home device.

In step 1108, the home device receives the server information and country code from the control device. The server information includes information relating to access to the service server, and an example of the server information may be address information for access to the service server. The country code means a code indicating information on the country where the user is located.

In step 1110, the home device accesses the service server using the information relating to access to the service server and receives the peer ID and peer group ID from the service server. The peer ID means an ID managed by the connectivity server to identify the home device, and the peer group ID means an ID to identify a group of home devices registered in the service server managing information on the home device.

In step 1112, the home device logs into the connectivity server using the access token received in step 1106, the peer ID and peer group ID received in step 1110, and the country code received in step 1108.

Figure 12:
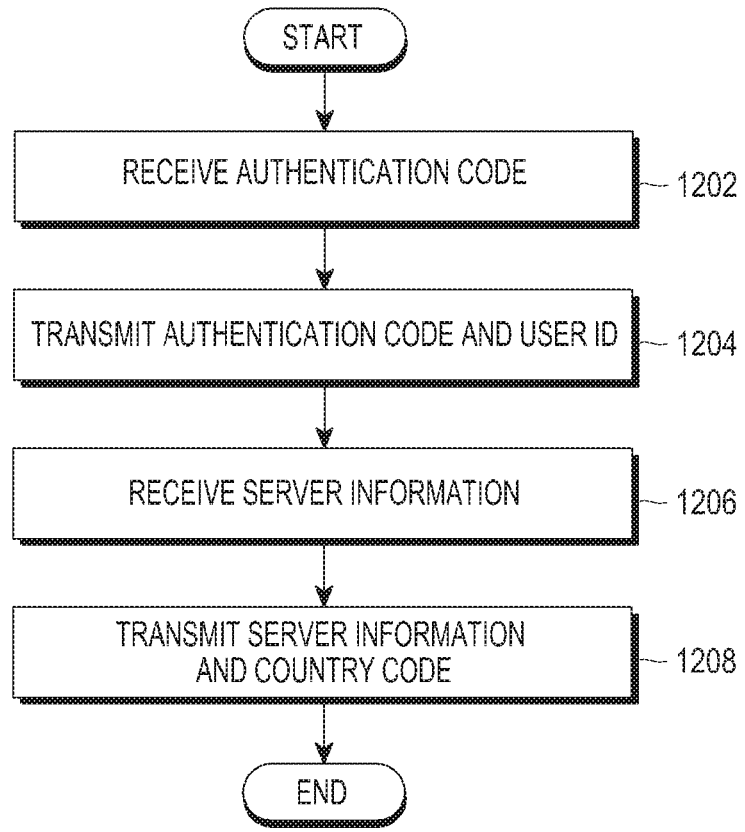
FIG. 12 is a flowchart illustrating an operation for a control device to register a home device in a server in a home network system according to an embodiment of the present invention.

FIG. 12 is a flowchart illustrating an operation for a control device to register a home device in a server in a home network system according to an embodiment of the present invention.

Referring to FIG. 12, the control device receives an authentication code used for the home device to receive an access token from an account server managing the user account of the control device in step 1202. Here, the control device is a device used for the purpose of controlling the home device, and the control device may be, e.g., a mobile terminal or TV. The access token denotes a key value used for a connectivity server to authenticate the authority to use the home device when the home device accesses the connectivity server managing the connection between home device and control device.

In step 1204, the control device transmits the received authentication code and user ID for the user of the control device to the home device.

In step 1206, the control device receives server information from the service server. The server information includes information relating to access to the service server, and an example of the server information may be address information for access to the service server.

In step 1208, the control device transmits the server information and country code to the home device. The country code means a code indicating information on the country where the user is located.

Figure 13:
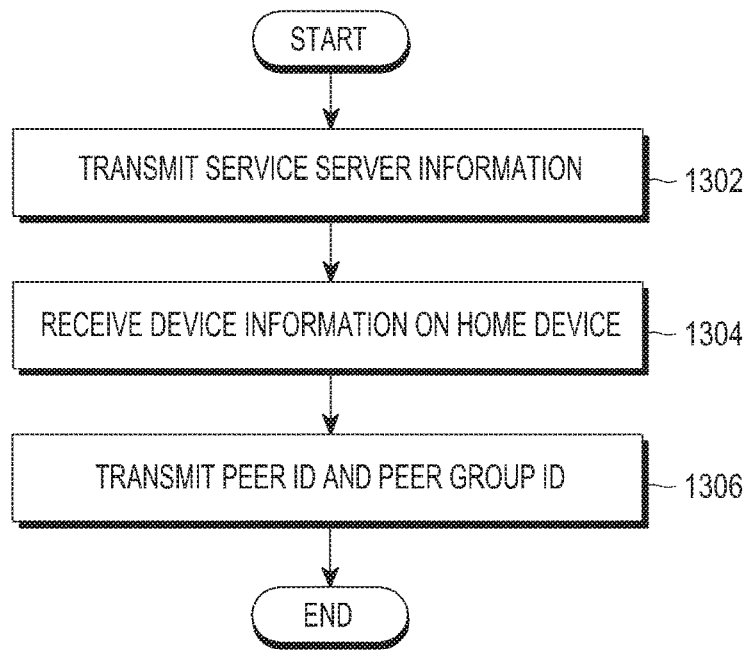
FIG. 13 is a flowchart illustrating an operation for a service server to register a home device in a home network system according to another embodiment of the present invention.

FIG. 13 is a flowchart illustrating an operation for a service server to register a home device in a home network system according to another embodiment of the present invention.

In FIG. 13, the service server is a server operated only for services provided from the home network system and provides the function of storing and managing all information for controlling the home device and the device information on the home device for information circulation of the home device.

Referring to FIG. 13, the service server transmits server information to the control device in step 1302. The server information includes information relating to access to the service server, and an example of the server information may be address information for access to the service server.

In step 1304, the service server receives and registers device information on the home device from the home device. Here, an example of the device information includes the type, name, description, manufacturer, model ID, serial number, sales location, and version of the home device.

In step 1306, the service server transmits a peer ID and peer group ID to the home device. The peer ID means an ID managed by the connectivity server to identify the home device, and the peer group ID means an ID for the user to identify a group of home devices registered in the service server managing device information on the home device.

Figure 14:
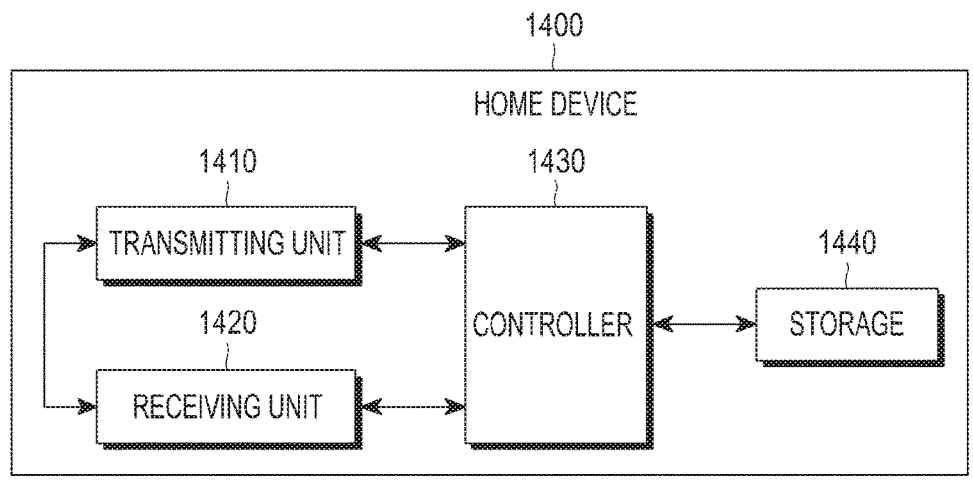
FIG. 14 is a device diagram illustrating an internal configuration of a home device registered in a server in a home network system according to an embodiment of the present invention.

FIG. 14 is a device diagram illustrating an internal configuration of a home device registered in a server in a home network system according to an embodiment of the present invention.

Referring to FIG. 14, the home device 1400 shown includes a transmitting unit 1410, a receiving unit 1420, a controller 1430, and a storage 1440.

The receiving unit 1420 of the home device 1400 receives a user ID for the user of the control device and an authentication code used for reception of an access token transmitted from the control device. Here, the access token denotes a key value used for a connectivity server to authenticate the authority to use the home device when the home device 1400 accesses the connectivity server managing the connection between home device 1400 and control device.

The transmitting unit 1410 of the home device 1400 transmits the user ID and authentication code received through the receiving unit 1420 to an account server managing the account for the user.

The receiving unit 1420 of the home device 1400 receives an access token, refresh token, and GUID from the account server and a peer ID, peer group ID, and country code from the control device. Here, the refresh token means a token used to renew the access token within a previously agreed-on valid period so that the access token may be used after the valid period elapses, and the GUID means an ID assigned and managed by the account server to identify the home device. Further, the peer ID means an ID managed by the connectivity server to identify the home device, the peer group ID an ID to identify a group of home devices registered in the service server managing information on the home device, and the country code a code indicating information on the country where the user is located.

Meanwhile, the receiving unit 1420 of the home device 1400 may receive server information transmitted from the control device, and in this case, the peer group ID is received from the service server, but not from the control device. The server information includes information relating to access to the service server, and an example of the server information may be address information for access to the service server.

The home device 1400 logs into the connectivity server using the access token, peer ID, peer group ID, and country code received through the receiving unit 1420. At this time, the controller 1430 of the home device controls the transmitting unit 1410 and the receiving unit 1420 so that the home device may log in the connectivity server, and the information communicated through the transmitting unit 1410 and the receiving unit 1420 is stored in the storage 1440.

Figure 15:
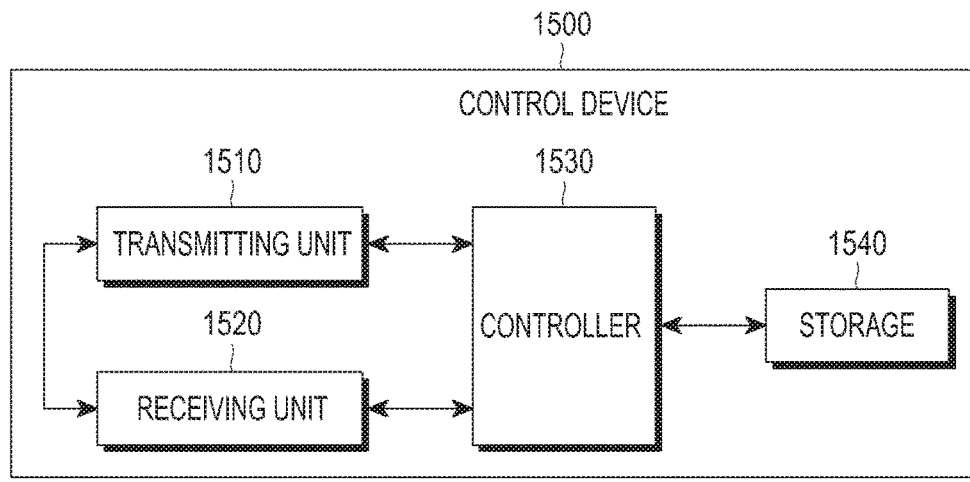
FIG. 15 is a device diagram illustrating an internal configuration of a control device registering a home device in a server in a home network system according to an embodiment of the present invention.

FIG. 15 is a device diagram illustrating an internal configuration of a control device registering a home device in a server in a home network system according to an embodiment of the present invention.

Referring to FIG. 15, the control device 1500 shown includes a transmitting unit 1510, a receiving unit 1520, a controller 1530, and a storage 1540.

The receiving unit 1520 of the control device 1500 receives an authentication code transmitted from the account server managing the account for the user of the control device 1500. The authentication code means a code used for the home device to receive the access token, and the access token denotes a key value used for a connectivity server to authenticate the authority to use the home device when the home device accesses the connectivity server managing the connection between home device and control device.

The transmitting unit 1510 of the control device 1500 transmits, to the home device, the authentication code received through the receiving unit 1520 and a user ID for the user of the control device 1500 and transmits a UUID for the home device and device information on the home device to a service server managing the device information on the home device. Here, the UUID and device information are information obtained and managed by the control device 1500 through a previous procedure for connection with the control device 1500 when the home device is first installed in the in the home (or out of the home). That is, the control device 1500 obtains the device information and UUID for the home device and stores the information in the storage 1540. Further, an example of the device information includes the type, name, description, manufacturer, model ID, serial number, sales location, and version of the home device. The receiving unit 1520 of the control device 1500 receives the peer ID transmitted from the service server. Here, the peer ID means an ID managed by the connectivity server to identify the home device.

The transmitting unit 1510 of the control device 1500 transmits the peer ID received through the receiving unit 1520, and a peer group ID and country code to the home device. The peer group ID and country code are information obtained and managed by the control device 1500 through a previous procedure for connection with the control device 1500 when the home device is first installed in the in the home (or out of the home). That is, the control device 1500 obtains the peer group ID and country code and stores the information in the storage 1540.

Meanwhile, the control device 1500 may receive not the peer ID but server information through the receiving unit 1520, and in such case, the transmitting unit 1110 of the control device 1500 transmits the server information and country code to the home device. The server information includes information relating to access to the service server, and an example of the server information may be address information for access to the service server.

Figure 16:
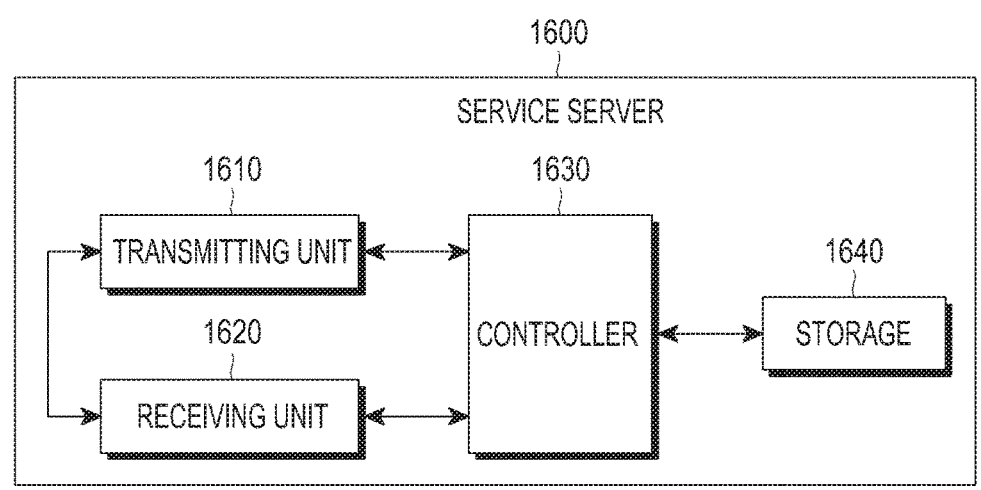
FIG. 16 is a device diagram illustrating an internal configuration of a service server registering a home device in a home network system according to an embodiment of the present invention.

The controller 1530 of the control device 1500 controls the operation of the transmitting unit 1510 and the receiving unit 1520, and the information communicated by the transmitting unit 1510 and the receiving unit 1520 is stored in the storage 1540. FIG. 16 is a device diagram illustrating an internal configuration of a service server registering a home device in a home network system according to an embodiment of the present invention.

Referring to FIG. 16, the service server 1600 shown includes a transmitting unit 1610, a receiving unit 1620, a controller 1630, and a storage 1640.

The receiving unit 1620 of the service server 1600 receives device information and UUID for the home device from the control device. Here, an example of the device information includes the type, name, description, manufacturer, model ID, serial number, sales location, and version of the home device.

The transmitting unit 1610 of the service server 1600 transmits, to the control device, the peer ID to be used for the home device to log in the connectivity server managing connection between home device and control device. Here, the peer ID means an ID managed by the connectivity server to identify the home device.

Meanwhile, the transmitting unit 1610 of the service server 1600 may transmit not the peer ID but server information. In this case, the receiving unit 1620 of the service server 1600 receives device information on the home device from the home device and registers the device information in the storage 1640, and the transmitting unit 1610 of the service server 1600 transmits the peer ID and peer group ID to the home device. The server information includes information relating to access to the service server, and an example of the server information may be address information for access to the service server. An example of the device information includes the type, name, description, manufacturer, model ID, serial number, sales location, and version of the home device. The peer group ID means an ID for identifying a group of the home devices registered in the storage 1640 of the service server 1600.

The controller 1630 of the service server 1600 controls the operation of the transmitting unit 1610 and the receiving unit 1620, and the information communicated by the transmitting unit 1610 and the receiving unit 1620 is stored in the storage 1640.

Figure 17:
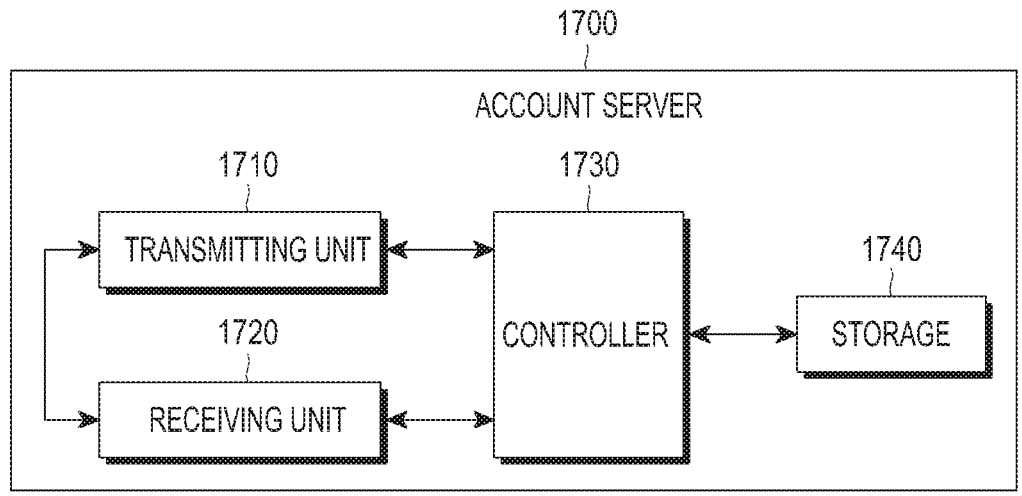
FIG. 17 is a device diagram illustrating an internal configuration of an account server registering a home device in a home network system according to an embodiment of the present invention.

FIG. 17 is a device diagram illustrating an internal configuration of an account server registering a home device in a home network system according to an embodiment of the present invention.

Referring to FIG. 17, the account server 1700 shown includes a transmitting unit 1710, a receiving unit 1720, a controller 1730, and a storage 1740.

The transmitting unit 1710 of the account server 1700 transmits, to a control device, an authentication code used for the home device to receive an access token in step 802. Here, the access token denotes a key value used for a connectivity server to authenticate the authority to use the home device when the home device accesses the connectivity server managing the connection between home device and control device.

The receiving unit 1720 of the account server 1700 receives the user ID for the user of the control device and the authentication code transmitted from the home device.

The controller 1730 of the account server 1700 identifies whether the control device authentication code transmitted from the transmitting unit 1710 is the same as the home device authentication code received from the receiving unit 1720. If, as a result of the identification, the control device authentication code is the same as the home device authentication code, the controller 1730 controls the transmitting unit 1710 to transmit an access token, a refresh token, and a GUID. That is, the transmitting unit 1710 of the account server 1700 transmits the access token, refresh token, and GUID to the home device under the control of the controller 1730. Here, the access token is used for the home device to log in the connectivity server. Further, the refresh token means a token used to renew the access token within a previously agreed-on valid period so that the access token may be used after the valid period elapses. The GUID means an ID assigned and managed by the account server to identify the home device.

The controller 1730 of the account server 1700 controls the operation of the transmitting unit 1710 and the receiving unit 1720, and the information communicated through the transmitting unit 1710 and the receiving unit 1720 is stored in the storage 1740.

Figure 18:
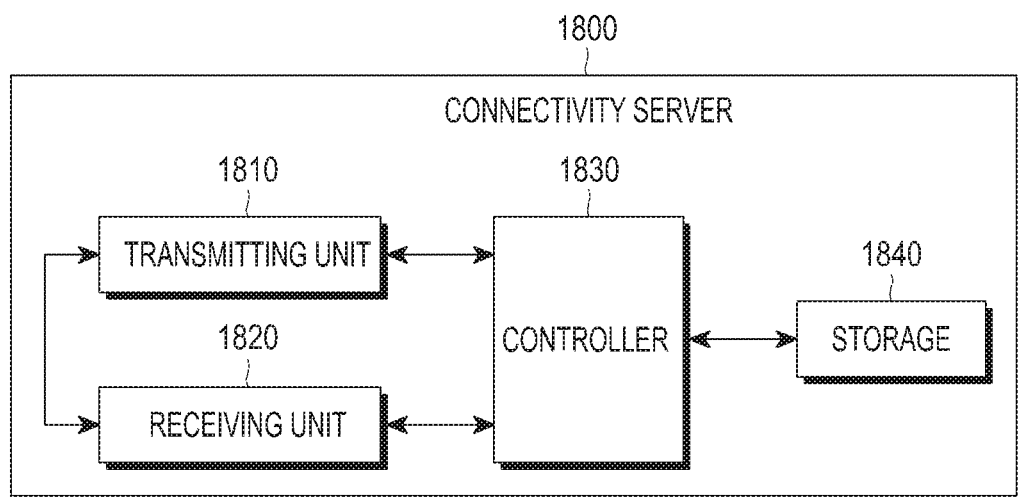
FIG. 18 is a device diagram illustrating an internal configuration of a connectivity server registering a home device in a home network system according to an embodiment of the present invention.

FIG. 18 is a device diagram illustrating an internal configuration of a connectivity server registering a home device in a home network system according to an embodiment of the present invention.

Referring to FIG. 18, the connectivity server 1800 shown includes a transmitting unit 1810, a receiving unit 1820, a controller 1830, and a storage 1840.

The receiving unit 1820 of the connectivity server 1800 receives a login request transmitted from the home device using the peer ID, peer group ID, country code, and access token. Here, the peer ID means an ID managed by the connectivity server to identify the home device, the peer group ID an ID for the user of the control device to identify a group of home devices registered in the service server managing device information on the home device, the country code a code indicating information on the country where the user is located, and the access token a token used to authenticate the authority of use of the home device.

The receiving unit 1820 of the connectivity server 1800 receives the login request. The transmitting unit 1810 of the connectivity server 1800 transmits, to the home device, a login response indicating that the login has succeeded corresponding to the login request and provides the control device with home device connection device including information indicating whether connection between home device and control device is made possible. Here, an example of the information indicating whether connection between home device and control device is made possible may be information indicating that the home device has logged into the connectivity server. In addition to the presence information, the home device connection information includes information on the IP address and port used by the home device and information on the type of network used by the home device as well as the information indicating that the home device has logged into the connectivity server. Here, the network type information may be, e.g., Wi-Fi-related information, 2G-related information, 3G-related information, and 4G-related information.

Although specific embodiments of the present invention have been described above, various changes may be made thereto without departing from the scope of the present invention. Thus, the scope of the present invention should not be limited to the above-described embodiments, and should rather be defined by the following claims and equivalents thereof.

The apparatuses and methods for registering a home device in a server, according to embodiments of the present invention, may be implemented in hardware, software, or a combination of hardware and software. Such software may be stored in a volatile or non-volatile storage device such as a read-only memory (ROM) or other storage devices, a memory, such as a random access memory (RAM), a memory chip, a device or an integrated circuit, or a storage medium, such as, e.g., a compact disk (CD), a digital video disk (DVD), a magnetic disk, or a magnetic tape, which allows for optical or magnetic recording while simultaneously read out by a machine (e.g., a computer). The methods for updating graphic screens according to an embodiment of the present invention may be implemented by a computer or portable terminal including a controller and a memory, and the memory may be an example of a storage medium that may be read out by a machine appropriate to store a program or programs including instructions for realizing the embodiments of the present invention.

Accordingly, the present invention encompasses a program containing codes for implementing the device or method set forth in the claims of this disclosure and a machine (e.g., computer)-readable storage medium storing the program. The program may be electronically transferred via any media such as communication signals transmitted through a wired or wireless connection and the present invention properly includes the equivalents thereof.

The present invention benefits provision of various home network services according to the same method and procedure in a home network system regardless of whether it is in or out of home.

The apparatuses for registering a home device in a server according to embodiments of the present invention may receive the program from a program providing device wiredly or wirelessly connected thereto and store the same. The program providing device may include a memory for storing a program including instructions to enable the graphic processing device to perform a preset content protection method and information necessary for the content protection method, a communication unit for performing wired or wireless communication with the graphic processing device, and a controller transmitting the program to the communication device automatically or at the request of the graphic processing device.

The invention claimed is:

1. A method of a home device to access a connectivity server in a home network system, the method comprising:
 performing a device-to-device (D2D) authentication procedure with a terminal;
 receiving, from the terminal, a user identifier (ID) and an authentication code based on the D2D authentication procedure, wherein the authentication code is received, from an account server, by the terminal, based on the user ID;
 transmitting, to the account server, the user ID and the authentication code;
 receiving an access token from the account server managing an account for the terminal in response to the transmission of the user ID and the authentication code;
 receiving, from the terminal, server information including information related to a service server;
 receiving, from the service server, a peer ID and a peer group ID based on the server information, wherein the peer group ID indicates a group of home devices that have been registered in the service server using the user ID, and wherein the peer ID is assigned by the service server for allowing the connectivity server to identify the home device; and
 logging into the connectivity server managing connection between the home device and the terminal based on the access token, the peer ID, and the peer group ID,
 wherein the peer ID is generated by the service server based on a device information and a unique user identifier (UUID) for the home device, and
 wherein the device information and the unique user identifier (UUID) are received by the service server from the home device via the terminal.

2. The method of claim 1, further comprising:
 receiving, from the account server, a refresh token used to renew the access token and a globally unique ID (GUID) assigned and managed by the account server to identify the home device.

3. The method of claim 1,
 wherein the access token includes a key value used for the connectivity server to authenticate an authority of use of the home device when the home device accesses the connectivity server.

4. The method of claim 1,
 wherein the server information is address information for access to the service server.

5. A method of a terminal to access, by a home device, a connectivity server in a home network system, the method comprising:
 performing a device-to-device (D2D) authentication procedure with the home device;
 transmitting, to the home device, a user identifier (ID) and an authentication code based on the D2D authentication procedure, wherein the authentication code is received, from an account server, by the terminal, based on the user ID, whereby the home device is configured to receive an access token from the account server managing an account for the terminal based on the user ID and the authentication code;

receiving, from a service server, server information including information relating to access to the service server; and transmitting, to the home device, the server information, whereby the home device is configured to get, from the service server, a peer ID and a peer group ID, wherein the peer group ID indicates a group of home devices that have been registered in the service server using the user ID, and wherein the peer ID is assigned by the service server for allowing the connectivity server to identify the home device, wherein the peer ID is generated by the service server based on a device information and a unique user identifier (UUID) for the home device, and wherein the device information and the unique user identifier (UUID) are received by the service server from the home device via the terminal.

6. The method of claim 5, further comprising:
transmitting, to the account server, the user ID; and
receiving, from the account server, the authentication code, in response to transmission of the user ID, wherein the account server is configured to manage the account for the terminal.

7. The method of claim 6,
wherein the access token includes a key value used for the connectivity server to authenticate an authority of use of the home device when the home device accesses the connectivity server.

8. The method of claim 5,
wherein the server information is address information for access to the service server.

9. A home device in a home network system, the home device comprising:
a transceiver;
a memory; and
at least one processor coupled to the transceiver and the memory, the at least one processor configured to:
perform a device-to-device (D2D) authentication procedure with a terminal;
receive, from the terminal, a user identifier (ID) and an authentication code based on the D2D authentication procedure;
transmit, to an account server, the user ID and the authentication code;
receive an access token from the account server managing an account for the terminal;
receive, from the terminal, server information including information relating to access to a service server;
receive, from the service server, a peer ID and a peer group ID, based on the server information, wherein the peer group ID indicates a group of home devices that have been registered in the service server using the user ID, and wherein the peer ID is assigned by the service server for allowing a connectivity server to identify the home device; and
log into the connectivity server managing connection between the home device and the terminal based on the access token, the peer ID, and the peer group ID,
wherein the peer ID is generated by the service server based on a device information and a unique user identifier (UUID) for the home device, and wherein the device information and the unique user identifier (UUID) are received by the service server from the home device via the terminal.

10. The home device of claim 9,
wherein the access token includes a key value used for the connectivity server to authenticate an authority of use of the home device when the home device accesses the connectivity server.

11. The home device of claim 9,
wherein the server information is address information for access to the service server.

12. The home device of claim 9,
wherein the at least one processor is further configured to receive, from the account server, a refresh token used to renew the access token and a globally unique ID (GUID) assigned and managed by the account server to identify the home device.

13. A terminal in a home network system, the terminal comprising:
a transceiver;
a memory; and
at least one processor coupled to the transceiver and the memory, the at least one processor configured to:
perform a device-to-device (D2D) authentication procedure with a home device;
transmit, to the home device, a user identifier (ID) and an authentication code based on the D2D authentication procedure, wherein the authentication code is received from an account server, whereby the home device is configured to receive an access token from the account server managing an account for the terminal in response to the transmission of the user ID and the authentication code;
receive, from a service server, server information including information relating to access to the service server; and
transmit, to the home device, the server information, whereby the home device is configured to get, from the service server, a peer ID and a peer group ID, wherein the peer group ID indicates a group of home devices that have been registered in the service server using the user ID, and wherein the peer ID is assigned by the service server for allowing a connectivity server to identify the home device,
wherein the peer ID is generated by the service server based on a device information and a unique user identifier (UUID) for the home device, and
wherein the device information and the unique user identifier (UUID) are received by the service server from the home device via the terminal.

14. The terminal of claim 13,
wherein the at least one processor is further configured to:
transmit, to the account server, the user ID; and
receive, from the account server, the authentication code, in response to transmission of the user ID, wherein the account server is configured to manage the account for the terminal.

15. The terminal of claim 14,
wherein the access token includes a key value used for the connectivity server to authenticate an authority of use of the home device when the home device accesses the connectivity server.

16. The terminal of claim 13,
wherein the server information is address information for access to the service server.

* * * * *